(12) United States Patent
Hyuugaji et al.

(10) Patent No.: US 10,976,473 B2
(45) Date of Patent: *Apr. 13, 2021

(54) METHOD FOR PRODUCING MEDICAL DEVICE AND MEDICAL DEVICE

(71) Applicants: JSR CORPORATION, Minato-ku (JP); JSR LIFE SCIENCES CORPORATION, Minato-ku (JP)

(72) Inventors: Satoshi Hyuugaji, Minato-ku (JP); Kazuhiro Iso, Minato-ku (JP)

(73) Assignees: JSR CORPORATION, Minato-ku (JP); JSR LIFE SCIENCES CORPORATION, Minato-ku (JP)

( * ) Notice: Subject to any disclaimer, the term of this patent is extended or adjusted under 35 U.S.C. 154(b) by 52 days.

This patent is subject to a terminal disclaimer.

(21) Appl. No.: 15/747,817

(22) PCT Filed: Jul. 26, 2016

(86) PCT No.: PCT/JP2016/071908
§ 371 (c)(1),
(2) Date: Jan. 26, 2018

(87) PCT Pub. No.: WO2017/018425
PCT Pub. Date: Feb. 2, 2017

(65) Prior Publication Data
US 2018/0217294 A1 Aug. 2, 2018

(30) Foreign Application Priority Data
Jul. 27, 2015 (JP) .............................. JP2015-147643

(51) Int. Cl.
F16C 33/04 (2006.01)
C07F 7/02 (2006.01)
G02B 1/04 (2006.01)
C08J 7/04 (2020.01)
C08F 220/28 (2006.01)
C08F 220/36 (2006.01)
C08F 220/54 (2006.01)
C08F 220/58 (2006.01)
(Continued)

(52) U.S. Cl.
CPC ............ G02B 1/043 (2013.01); C08F 220/28 (2013.01); C08F 220/36 (2013.01); C08F 220/54 (2013.01); C08F 220/58 (2013.01); C08F 226/10 (2013.01); C08J 7/0427 (2020.01); C09D 5/00 (2013.01); C09D 133/14 (2013.01); C09D 133/24 (2013.01); C09D 139/06 (2013.01); C10M 107/28 (2013.01); C10M 107/42 (2013.01); C10M 107/48 (2013.01); C08F 220/286 (2020.02); C08F 220/365 (2020.02); C08J 2383/04 (2013.01); C08J 2433/14 (2013.01); C08J 2433/24 (2013.01); C08J 2439/06 (2013.01); C10M 2209/0845 (2013.01); C10M 2217/028 (2013.01); C10M 2217/0245 (2013.01); C10M 2225/025 (2013.01); C10N 2050/08 (2013.01); G02C 7/04 (2013.01)

(58) Field of Classification Search
CPC .............. C10M 145/26; C10M 145/28; C10M 2209/0845; C10M 2217/0245; C10M 2217/028; C10M 2225/025; C10M 107/28; C10M 107/42; C10M 107/48; G02B 1/04; G02B 1/043; C11D 3/37; C08J 7/0427; C08J 2383/04; C08J 2433/14; C08J 2433/24; C08J 2439/06; C08F 220/28; C08F 220/36; C08F 220/54; C08F 220/58; C08F 226/10; C08F 220/286; C08F 220/365; C09D 5/00; C09D 133/14; C09D 133/24; C09D 139/06; C10N 2050/08; G02C 7/04
USPC ......................................................... 508/107
See application file for complete search history.

(56) References Cited

U.S. PATENT DOCUMENTS 6,037,328 A  3/2000  Hu et al.
6,200,626 B1  3/2001  Grobe, III et al.
(Continued)

FOREIGN PATENT DOCUMENTS

CN  1703432 A  11/2005
JP  2001-337298 A  12/2001
(Continued)

OTHER PUBLICATIONS

Extended European Search Report dated Feb. 25, 2019 in Patent Application No. 16830530.8, 7 pages.
(Continued)

Primary Examiner — Prem C Singh
Assistant Examiner — Francis C Campanell
(74) Attorney, Agent, or Firm — Oblon, McClelland, Maier & Neustadt, L.L.P.

(57) ABSTRACT

A method for producing a medical device, and a medical device are provided, and the production method includes a step of heating a device together with a solution containing a polymer having the following repeating unit (A) and the following repeating unit (B), or a step of bringing a device into contact with a heated product of a solution containing a polymer having the following repeating unit (A) and the following repeating unit (B):

(A) a hydrophilic repeating unit; and
(B) a repeating unit having a polyoxyalkylene group in a side chain, the terminal of the side chain being composed of an alkyl group having 5 to 30 carbon atoms, an alkanoyl group having 5 to 30 carbon atoms, or an aryl group having 6 to 30 carbon atoms.

20 Claims, No Drawings

(51) Int. Cl.
*C08F 226/10* (2006.01)
*C09D 5/00* (2006.01)
*C09D 133/14* (2006.01)
*C09D 133/24* (2006.01)
*C09D 139/06* (2006.01)
*C10M 107/28* (2006.01)
*C10M 107/42* (2006.01)
*C10M 107/48* (2006.01)
*G02C 7/04* (2006.01)
*C10N 50/08* (2006.01)

(56) References Cited

U.S. PATENT DOCUMENTS

| | | | |
|---|---|---|---|
| 6,281,319 | B1 | 8/2001 | Mentak |
| 2001/0050749 | A1 | 12/2001 | Watanabe |
| 2001/0056165 | A1 | 12/2001 | Mentak |
| 2002/0007032 | A1 | 1/2002 | Mentak |
| 2002/0128417 | A1 | 9/2002 | Mentak |
| 2004/0052746 | A1 | 3/2004 | Tamareselvy et al. |
| 2004/0241130 | A1 | 12/2004 | Tamareselvy et al. |
| 2007/0010595 | A1 | 1/2007 | McCabe et al. |
| 2007/0010883 | A1 | 1/2007 | Mentak |
| 2008/0014160 | A1 | 1/2008 | Faivre et al. |
| 2008/0233069 | A1 | 9/2008 | Tamareselvy et al. |
| 2010/0056647 | A1 | 3/2010 | Graham et al. |
| 2011/0021656 | A1 | 1/2011 | McCabe et al. |
| 2011/0245077 | A1* | 10/2011 | Anderson ............... A61L 15/26 502/402 |
| 2013/0208236 | A1 | 8/2013 | McCabe et al. |
| 2014/0185005 | A1 | 7/2014 | McCabe et al. |
| 2015/0219928 | A1 | 8/2015 | McCabe et al. |
| 2017/0058237 | A1* | 3/2017 | Iso ..................... C11D 3/3773 |

FOREIGN PATENT DOCUMENTS

| | | |
|---|---|---|
| JP | 2002-542317 A | 12/2002 |
| JP | 2003-500507 A | 1/2003 |
| JP | 2006-512425 A | 4/2006 |
| JP | 2012-501311 A | 1/2012 |
| JP | 5154231 B2 | 2/2013 |
| WO | 00/61646 A1 | 10/2000 |
| WO | 2004/024779 A2 | 3/2004 |
| WO | 2005/092276 A1 | 10/2005 |
| WO | 2006/088758 A2 | 8/2006 |
| WO | 2008/013950 A2 | 1/2008 |
| WO | 2010/026097 A1 | 3/2010 |
| WO | WO 2013/074535 A1 | 5/2013 |
| WO | WO 2015/119256 A1 | 8/2015 |

OTHER PUBLICATIONS

International Search Report dated Oct. 25, 2016 in PCT/JP2016/071908 filed Jul. 26, 2016.

Combined Chinese Office Action and Search Report dated Mar. 30, 2020 in Chinese Patent Application No. 201680011941.2 (with unedited computer generated English translation and English translation of Category of Cited Documents), 15 pages.

* cited by examiner

METHOD FOR PRODUCING MEDICAL DEVICE AND MEDICAL DEVICE

TECHNICAL FIELD

The present invention relates to a method for producing a medical device, and a medical device.

BACKGROUND ART

Contact lenses are roughly classified into hydrous contact lenses (including soft contact lenses) and non-hydrous contact lenses (including hard contact lenses and soft contact lenses), and hydrous contact lenses generally have an advantage that the lenses have a more satisfactory feeling of wearing than non-hydrous contact lenses.

However, since conventional hydrous contact lenses have high hydrability, there have been problems, for example, that lenses dry up quickly, and oxygen permeability is decreased.

Thus, silicone hydrogel contact lenses, which have high oxygen permeability while being less hydratable, have been developed, and in recent years, these constitute the mainstream of contact lenses. However, silicone hydrogels have a problem that since the silicone chains contained therein exhibit hydrophobicity, the feeling of wearing is not excellent. In a case in which these contact lenses are left to stand and continuously used in that state, there is a risk that, for example, eyestrain, reddening, pain, lowering of the visual acuity correction power, and adverse effects on the cornea may occur.

Under such circumstances, technologies for modifying lens materials have been developed for the purpose of enhancing the hydrophilicity of the lens surface, preventing the adhesion of contaminants such as lipids, or imparting lubricity. For example, Patent Literature 1 discloses a technology of irradiating the surface of an ophthalmic lens with high-frequency plasma or excimer light, bringing the surface with a hydrophilic monomer solution, subsequently irradiating the surface with ultraviolet radiation, and immobilizing (graft polymerizing) the hydrophilic monomer on the ophthalmic lens surface. Furthermore, in Patent Literature 2, the surface of an ophthalmic lens is modified by coating with carbon by a plasma polymerization reaction, and conducting a graft-polymerization of a hydrophilic monomer to the lens surface.

In Patent Literature 3, it attempts to improve the wearing sensation of a contact lens by heating a lens obtained after polymerization in a solution including a wetting-out agent.

Besides, various cleaning solutions, storage solutions and coating solutions for contact lenses have been suggested for the purpose of improving the hydrophilicity of contact lens surfaces. For example, as the cleaning solutions for contact lenses, poly(oxyethylene)-poly(oxypropylene) block copolymers (poloxamer and poloxamine), which are nonionic surfactants, have been widely used heretofore (Patent Literature 4).

CITATION LIST

Patent Literature

Patent Literature 1: JP 2001-337298 A
Patent Literature 2: JP 2003-500507 A
Patent Literature 3: JP 5154231 B1
Patent Literature 4: U.S. Pat. No. 6,037,328 A

SUMMARY OF INVENTION

Technical Problem

However, in the technologies described in Patent Literatures 1 and 2, since maintenance of, for example, a plasma irradiation apparatus, or an ultraviolet irradiation apparatus is required, and the number of the production processes is also increased, cost increases are indispensable. Also, after such a surface modifying step, a washing step for removing unreacted monomer is also needed. At the time of this washing, defensive means against microorganism propagation is indispensable, and extreme care is needed. Therefore, the technologies described in Patent Literatures 1 and 2 may have a significant problem in view of cost.

Furthermore, the lens modified by the technique described in Patent Literature 3 is not satisfactory in terms of lubricity.

Also, the nonionic surfactant described in Patent Literature 4 is not sufficient in view of the performance of hydrophilizing lens surfaces and the performance of imparting lubricity.

The present invention was achieved in view of the problems described above, and it is an object of the invention to provide a method for easily producing a medical device having excellent hydrophilicity and lubricity.

Solution to Problem

Thus, the inventors of the present invention conducted a thorough investigation, and as a result, the inventors found that when a device is heated together with a solution containing a polymer having a hydrophilic repeating unit and a repeating unit that has a polyoxyalkylene group in a side chain and a particular group at the terminal of the side chain, or the device is brought into contact with the aforementioned solution that has been heated, superior hydrophilicity and lubricity can be imparted to the device. Thus, the inventors completed the present invention.

Configuration examples of the present invention are as follows.

[1] A method for producing a medical device, the method including a step of heating a device together with a solution containing a polymer having the following repeating unit (A) and the following repeating unit (B), or a step of bringing a device into contact with a heated product of a solution containing a polymer having the following repeating unit (A) and the following repeating unit (B):

(A) a hydrophilic repeating unit; and
(B) a repeating unit having a polyoxyalkylene group in a side chain, the terminal of the side chain being composed of an alkyl group having 5 to 30 carbon atoms, an alkanoyl group having 5 to 30 carbon atoms, or an aryl group having 6 to 30 carbon atoms.

[2] The method for producing a medical device according to [1], wherein the repeating unit (A) is one or more selected from the group consisting of a repeating unit (A-1) having a polyoxyalkylene group in a side chain, the terminal of the side chain being composed of a hydrogen atom or an alkyl group having 1 to 4 carbon atoms; a repeating unit (A-2) having an ammonioalkyl phosphate group at the terminal of a side chain; a repeating unit (A-3) having an amide group in a side chain; a repeating unit (A-4) having a heterocyclic ring containing nitrogen and oxygen, at the terminal of a side chain; a repeating unit (A-5) having a lactam in a side chain; a repeating unit (A-6) having a betainic group at the terminal of a side chain; an anionic repeating unit (A-7); and a cationic repeating unit (A-8).

[3] The method for producing a medical device according to [1] or [2], wherein the repeating unit (A) is one or more selected from the group consisting of a repeating unit (A-1) represented by the following Formula (1); a repeating unit (A-2) represented by the following Formula (2); a repeating unit (A-3) represented by the following Formula (3): a repeating unit (A-4) represented by the following Formula (4); a repeating unit (A-5) represented by the following Formula (5); a repeating unit (A-6) represented by the following Formula (6); an anionic repeating unit (A-7); and a repeating unit (A-8) represented by the following Formula (8):

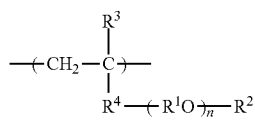
(1)

wherein in Formula (1), $R^1$ represents an alkylene group having 2 to 4 carbon atoms; $R^2$ represents a hydrogen atom or an alkyl group having 1 to 4 carbon atoms; $R^3$ represents a hydrogen atom or a methyl group; $R^4$ represents —O—, *—(C=O)—O—, *—(C=O)—NR$^5$—, *—NR$^5$—(C=O)— (wherein $R^5$ represents a hydrogen atom or an organic group having 1 to 10 carbon atoms; and the symbol * represents the position of bonding to the carbon atom to which $R^3$ in Formula (1) is bonded), or a phenylene group; and n represents 2 to 100 as an average value,

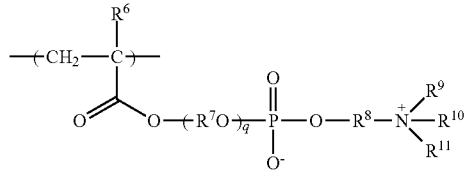
(2)

wherein i Formula (2), $R^5$ represents a hydrogen atom or a methyl group; $R^7$ represents an alkylene group having 2 to 4 carbon atoms; $R^8$ represents an alkylene group having 1 to 10 carbon atoms; $R^9$, $R^{10}$, and $R^{11}$ independently represent a hydrogen atom or a hydrocarbon group having 1 to 8 carbon atoms; and q represents 1 to 10 as an average value,

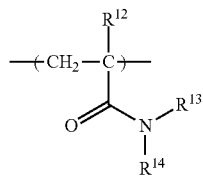
(3)

wherein in Formula (3), $R^{12}$ represents a hydrogen atom or a methyl group; $R^{13}$ and $R^{14}$ independently represent a hydrogen atom, an alkyl group having 1 to 6 carbon atoms, or a hydroxyalkyl group having 1 to 6 carbon atoms,

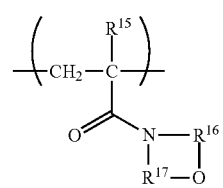
(4)

wherein in Formula (4), $R^{15}$ represents a hydrogen atom or a methyl group; and $R^{16}$ and $R^{17}$ independently represent an alkylene group having 1 to 3 carbon atoms,

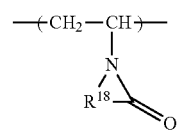
(5)

wherein in Formula (5), $R^{18}$ represents an alkylene group having 1 to 5 carbon atoms,

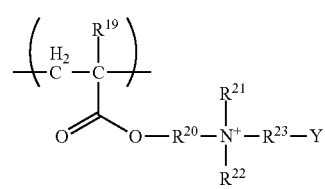
(6)

wherein in Formula (6), Y represents —(C=O)—O—, —(P=S=O)—O—, —O(O=S=O)O—, —(S=O)O—, —O(S=O)O—, —OP(=O)(OR$^{24}$)O—, —OP(=O)(R$^{24}$)O—, —P(=O)(OR$^{24}$)O—, or —P(=O)(R$^{24}$)O— (wherein $R^{24}$ represents an alkyl group having 1 to 3 carbon atoms); $R^{19}$ represents a hydrogen atom or a methyl group; $R^{20}$ represents a divalent organic group having 1 to 10 carbon atoms; $R^{21}$ and $R^{22}$ independently represent a hydrocarbon group having 1 to 10 carbon atoms; and $R^{23}$ represents a divalent organic group having 1 to 10 carbon atoms, and

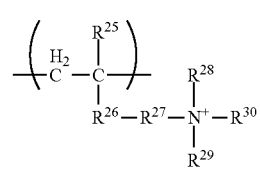
(8)

wherein in Formula (8), $R^{25}$ represents a hydrogen atom or a methyl group; $R^{26}$ represents —O—, *—(C=O)—O—, *—(C=O)—NR$^{31}$—, *—NR$^{31}$—(C=O)— (wherein $R^{31}$ represents a hydrogen atom or an organic group having 1 to 10 carbon atoms; and the symbol * represents the position of bonding to the carbon atom in Formula (8), to which $R^{25}$ is bonded), or a phenylene group; $R^{27}$ represents a divalent organic group having 1 to 10 carbon atoms; and $R^{28}$, $R^{29}$, and $R^{30}$ independently represent a hydrocarbon group having 1 to 10 carbon atoms.

[4] The method for producing a medical device according to any one of [1] to [3], wherein the repeating unit (B) is a repeating unit derived from a monomer having an ethylenically unsaturated bond.

[5] The method for producing a medical device according to any one of [1] to [4], wherein the repeating unit (B) is represented by the following Formula (b2):

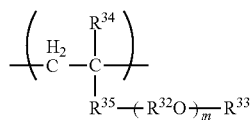

wherein in Formula (b2), $R^{32}$ represents an alkylene group having 2 to 4 carbon atoms; $R^{33}$ represents an alkyl group having 5 to 30 carbon atoms, an alkanoyl group having 5 to 30 carbon atoms, or an aryl group having 6 to 30 carbon atoms; $R^{34}$ represents a hydrogen atom or a methyl group; $R^{35}$ represents —O—, —(C=O)—O—, —(C=O)—NR$^{36}$—, —NR$^{36}$—(C=O)— (wherein $R^{36}$ represents a hydrogen atom or an organic group having 1 to 10 carbon atoms; and the symbol  represents the position of bonding to the carbon atom in Formula (b2), to which $R^{34}$ is bonded), or a phenylene group; and m represents 2 to 100 as an average value.

[6] The method for producing a medical device according to any one of [1] to [5], wherein the polymer further has one or more kinds of repeating unit (C) selected from the group consisting of a repeating unit (C-1) represented by the following Formula (c1) and a repeating unit (C-2) having a group represented by the following formula (c2) at the terminal of a side chain:

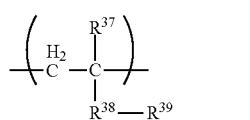

wherein in Formula (c1), $R^{37}$ represents a hydrogen atom or a methyl group; $R^{38}$ represents —O—, *—(C=O)—O—, *—(C=O)—NR$^{40}$—, *—NR$^{40}$—(C=O)— (wherein $R^{40}$ represents a hydrogen atom or an organic group having 1 to 10 carbon atoms; and the symbol * represents the position of bonding to the carbon atom in Formula (c1), to which $R^{37}$ is bonded), or a phenylene group; and $R^{39}$ represents a hydrocarbon group having 4 to 30 carbon atoms:

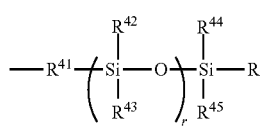

wherein in Formula (c2), $R^{41}$ represents a divalent organic group having 1 to 10 carbon atoms; $R^{42}$ and $R^{43}$ independently represent an organic group having 1 to 10 carbon atoms; $R^{44}$, $R^{45}$, and $R^{46}$ independently represent —OSi($R^{49}$)$_3$ (wherein $R^{49}$ independently represent a hydrogen atom or an organic group having 1 to 8 carbon atoms), or an organic group having 1 to 10 carbon atoms; and r represents 0 to 200 as an average value.

[7] The method for producing a medical device according to any one of [1] to [6], wherein the polymer is water-soluble.

[8] The method for producing a medical device according to any one of [1] to [7], wherein the device contains a silicone.

[9] The method for producing a medical device according to any one of [1] to [8], wherein the device is formed from a silicone hydrogel.

[10] The method for producing a medical device according to any one of [1] to [9], wherein the device is a silicone hydrogel contact lens.

[11] A medical device produced by the production method according to any one of [1] to [10].

[12] A medical device comprising a heated product of a solution containing a polymer having the following repeating unit (A) and the following repeating unit (B) on at least a portion of the surface:
(A) a hydrophilic repeating unit; and
(B) a repeating unit having a polyoxyalkylene group in a side chain, the terminal of the side chain being composed of an alkyl group having 5 to 30 carbon atoms, an alkanoyl group having 5 to 30 carbon atoms, or an aryl group having 6 to 30 carbon atoms.

Advantageous Effects of Invention

According to the production method of the present invention, a medical device having excellent hydrophilicity and lubricity can be easily produced, and a medical device having excellent sustainability of these effects can be easily produced.

Therefore, according to the method for producing a medical device of the present invention, a medical device that provides the above-described effects, particularly a medical device containing a silicone, a medical device formed from a silicone hydrogel, or a silicone hydrogel contact lens can be produced conveniently at low cost.

MODE FOR CARRYING OUT THE INVENTION

《Method for Producing Medical Device》

The method for producing a medical device of the present invention includes a step of heating a device together with a solution containing a polymer as described below, or a step of bringing a device into contact with a heated product of a solution containing a polymer as described below.

As such, only by using a particular solution and heating the solution in a state of being in contact with a device, or only by bringing a heated product of the solution into contact with a device, a medical device having excellent hydrophilicity, lubricity and antifouling properties, particularly, a medical device containing a silicone, a medical device formed from a silicone hydrogel, or a silicone hydrogel contact lens can be produced conveniently at low cost.

Particularly, since the polymer described below has a particular repeating unit (B) together with a repeating unit (A), the polymer exhibits a LCST (lower critical solution temperature), and undergoes phase transition to a solid phase when heated, so that at this time, the polymer can easily adsorb to a device. Also, according to the present invention, although the reason is not clearly understood, even if the polymer is further cooled, the state of the polymer being adsorbed to the device is maintained, and thus, it is speculated that a lubricative layer has been formed. In the present invention, initially desired effects are exhibited by having a heating process using a particular solution; however, a substance exhibiting the LCST usually returns to the liquid phase when cooled, and production of such an effect can never be anticipated. Therefore, the effect of the present invention is a remarkable effect that cannot be imagined conventionally.

Meanwhile, in regard to the medical device obtained by the present invention, it is not at all practical to directly specify, for example, the structure of the device.

When a device is heated together with a solution containing the above-mentioned polymer, it is desirable that the solution and the device are brought into contact and heated, and regarding the heating conditions, the temperature is preferably 30° C. to 150° C., more preferably 30° C. to 135° C., and even more preferably 35° C. to 135° C., while the time is preferably 20 minutes to 72 hours, and more preferably 20 minutes to 24 hours. The heating conditions may be determined according to the device or polymer used, and the heating time may be selected according to the heating temperature, or the heating temperature may be selected according to the heating time, for example, by extending the time in a case in which the temperature is low.

Regarding the heating conditions, more specifically, heating may be carried out under either normal pressure conditions or sterilized conditions as described below, or in combination of those conditions.

Regarding the normal pressure conditions, conditions of 30° C. to 80° C. under normal pressure for 30 minutes to 72 hours are preferred, conditions of 35° C. to 70° C. under normal pressure for 1 hour to 24 hours are more preferred, and conditions of 35° C. to 60° C. under normal pressure for 1 hour to 24 hours are even more preferred.

The heating may also be carried out when the device is subjected to autoclave sterilization, and preferred sterilization conditions in this case are in the range of from conditions of 115° C. for 30 minutes to conditions of 135° C. for 20 minutes. More preferred sterilization conditions are in the range of from conditions of 120° C. for 30 minutes to conditions of 135° C. for 20 minutes.

The term autoclave sterilization according the present specification refers to the high pressure steam method described in the 16$^{th}$ revision of the Japanese Pharmacopoeia, and the autoclave sterilization can be carried out as in the case of conventional examples described in the same pharmacopoeia, or under the conditions of a longer time period.

In regard to the production method of the present invention, production may be carried out in the same manner as in conventional methods for producing medical devices except for the step described above, and for example, after the above-described step is carried out, a washing or drying process may be carried out as necessary.

Regarding the heated product for the step of bringing a device into contact with a heated product of a solution containing a polymer as described below, a product obtained by heating the solution under the same conditions as the above-described conditions may be mentioned, and when the heated product is brought into contact with a device, the contacting may be implemented under normal temperature and normal pressure, or may be implemented by heating under conditions such as described above.

<Device>

The device that is heated together with the solution, or the device that is brought into contact with the solution that has been heated, is not particularly limited; however, from the viewpoint that the effects of the present invention can be manifested more effectively, a device containing a silicone is preferred, a device formed from a silicone hydrogel is more preferred, and a silicone hydrogel contact lens is even more preferred. The device is subjected to a step of being treated by heating together with the above-described solution or a step of being brought into contact with the above-described solution that has been heated, and thus becomes a medical device.

The device containing a silicone is not particularly limited as long as the device contains a silicone; however, examples include a contact lens, a medical catheter, and a medical balloon, all of which contain silicones.

Regarding the device formed from a silicone hydrogel, a device made of a silicone hydrogel is preferred, and a silicone hydrogel contact lens is more preferred. According to the production method of the present invention, since the effect described above can be imparted more effectively to a device formed from a silicone hydrogel, it is particularly preferable to use such a device.

The device may be subjected to, for example, a plasma treatment, a UV ozone treatment, or an internal wetting-out agent treatment.

<Polymer>

The polymer that is contained in the solution has the following repeating unit (A) and the repeating unit (B):

(A) a hydrophilic repeating unit; and (B) a repeating unit having a polyoxyalkylene group in a side chain, the terminal of the side chain being composed of an alkyl group having 5 to 30 carbon atoms, an alkanoyl group having 5 to 30 carbon atoms, or an aryl group having 6 to 30 carbon atoms.

[Repeating Unit (A)]

The repeating unit (A) is not particularly limited as long as it is a hydrophilic repeating unit and is a repeating unit other than the repeating unit (B); however, it is preferable that the repeating unit (A) is one or more selected from the group consisting of a repeating unit (A-1) having a polyoxyalkylene group in a side chain, the terminal of the side chain being composed of a hydrogen atom or an alkyl group having 1 to 4 carbon atoms; a repeating unit (A-2) having an ammonioalkyl phosphate group at the terminal of a side chain; a repeating unit (A-3) having an amide group in a side chain; a repeating unit (A-4) having a heterocyclic ring containing nitrogen and oxygen, at the terminal of a side chain; a repeating unit (A-5) having a lactam in a side chain; a repeating unit (A-6) having a betainic group at the terminal of a side chain; an anionic repeating unit (A-7); and a cationic repeating unit (A-8).

When the polymer contains such a repeating unit (A), a medical device having excellent surface hydrophilicity and lubricity can be easily obtained. In a case in which a contact lens is used as the device, a contact lens which has an excellent feeling of wearing and is not likely to have, for example, eyestrain, reddening, pain, lowering of the visual acuity correction power, and adverse effects on the cornea, can be easily obtained.

According to the present specification, a hydrophilic repeating unit means a repeating unit having a characteristic that exhibits a strong affinity with water. Specifically, in a case in which a homopolymer composed only of a repeating unit that is the same as a repeating unit that constitutes the polymer (a homopolymer having a number average molecular weight of about 10,000 according to the measurement method of the Examples), has a solubility of 1 g or more in 100 g of pure water at normal temperature (25° C.), the repeating unit is considered as hydrophilic.

(Repeating Unit (A-1))

The repeating unit (A-1) has a polyoxyalkylene group in a side chain, and has the terminal of the side chain formed from a hydrogen atom or an alkyl group having 1 to 4 carbon atoms.

The repeating unit (A-1) is preferably a repeating unit having a structure represented by the following Formula (1') at the terminal of a side chain. Examples of the repeating unit having a structure represented by Formula (1') at the terminal of a side chain include known repeating units, and above all, for example, a (meth)acrylate-based repeating unit, a (meth)acrylamide-based repeating unit, and a styrene-based repeating unit are preferred. Among these, a repeating unit represented by the following Formula (1) is preferred:

(1')

wherein in Formula (1'), $R^1$ represents an alkylene group having 2 to 4 carbon atoms; $R^2$ represents a hydrogen atom or an alkyl group having 1 to 4 carbon atoms; and n represents 2 to 100 as an average value, and

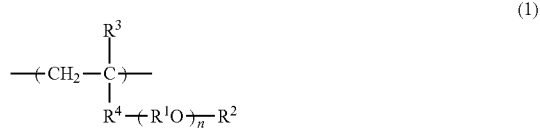
(1)

in Formula (1), $R^{1'}$ $R^2$ and n have the same meanings as $R^2$ and n in Formula (1'); and $R^3$ represents a hydrogen atom or a methyl group; $R^4$ represents —O—, *—(C=O)—O—, *—(C=O)—NR$^5$—, *—NR$^5$—(C=O)— (wherein $R^5$ represents a hydrogen atom or an organic group having 1 to 10 carbon atoms; and the symbol * represents the position of bonding to the carbon atom in Formula (1), to which $R^3$ is bonded), or a phenylene group.

n units $R^1$'s may be identical or different, and a plurality of $R^1$'s included in a repeating unit may be identical or different. In the following description, similarly in the case of other reference symbols in the various structural units as well, a plurality of groups assigned with the same reference symbol that are included in a repeating unit may be identical or different. That is, for example, a plurality of $R^2$'s included in a repeating unit may be identical or different.

The number of carbon atoms of the alkylene group represented by $R^1$ is preferably 2 or 3, and more preferably 2.

Furthermore, the alkylene group represented by $R^1$ may be linear or branched, and specific examples thereof include an ethane-1,2-diyl group, a propane-1,2-diyl group, a propane-1,3-diyl group, a propane-2,2-diyl group, a butane-1,2-diyl group, a butane-1,3-diyl group, and a butane-1,4-diyl group. Among these, from the viewpoint of having easy availability and excellent hydrophilization performance, an ethane-1,2-diyl group is preferred.

The number of carbon atoms of the alkyl group for $R^2$ is preferably 1 to 3, more preferably 1 or 2, and even more preferably 1, from the viewpoint of having, for example, easy availability and excellent hydrophilization performance. Furthermore, the alkyl group represented by $R^2$ may be linear or branched, and specific examples thereof include a methyl group, an ethyl group, an n-propyl group, an isopropyl group, an n-butyl group, an isobutyl group, a sec-butyl group, and a tert-butyl group.

Among $R^2$'s as such, from the viewpoint of having, for example, easy availability and excellent hydrophilization performance, a hydrogen atom or an alkyl group having 1 to 3 carbon atoms is preferred, a hydrogen atom or an alkyl group having 1 or 2 carbon atoms is more preferred, a hydrogen atom or a methyl group is even more preferred, and a methyl group is particularly preferred.

Examples of the phenylene group for $R^4$ include a 1,2-phenylene group, a 1,3-phenylene group, and a 1,4-phenylene group.

The number of carbon atoms of the organic group for $R^5$ is preferably 1 to 6. As the organic group, a hydrocarbon group may be mentioned. Such a hydrocarbon group is a concept including an aliphatic hydrocarbon group, an alicyclic hydrocarbon group, and an aromatic hydrocarbon group.

The aliphatic hydrocarbon group for $R^5$ may be linear or branched, and specific examples thereof include an alkyl group such as a methyl group, an ethyl group, an n-propyl group, an isopropyl group, an n-butyl group, an isobutyl group, a sec-butyl group, a tert-butyl group, a pentyl group, a hexyl group, a heptyl group, an octyl group, a nonyl group, and a decyl group.

The alicyclic hydrocarbon group is roughly classified into a monocyclic alicyclic hydrocarbon group and a bridged cyclic hydrocarbon group. Examples of the monocyclic alicyclic hydrocarbon group include a cycloalkyl group such as a cyclopropyl group and a cyclohexyl group. Furthermore, examples of the bridged cyclic hydrocarbon group include an isobornyl group.

Examples of the aromatic hydrocarbon group include an aryl group such as a phenyl group.

Among the substituents for $R^4$, from the viewpoint of having, for example, excellent hydrophilization performance, *—(C=O)—O— or a phenylene group is preferred, and *—(C=O)—O— is particularly preferred.

n is preferably 4 to 90 as an average value, more preferably 8 to 90 as an average value, even more preferably 8 to 60 as an average value, still more preferably 8 to 40 as an average value, and particularly preferably 9 to 25 as an average value.

Meanwhile, the various "average values" in the present specification can be analyzed by NMR. For example, the average value of n can be calculated by analyzing the structure of the formula (1) by $^1$H-NMR, and comparing the integrated values of the respective proton peaks of the alkylene group having 2 to 4 carbon atoms for $R^1$ and the terminal methyl group of the alkyl group having 1 to 4 carbon atoms for $R^2$.

Examples of the monomer from which such a repeating unit (A-1) is derived include polyethylene glycol (meth)acrylate, polypropylene glycol (meth)acrylate, polyethylene glycol polypropylene glycol (meth)acrylate, polyethylene glycol polytetramethylene glycol (meth)acrylate, polypropylene glycol polytetramethylene glycol (meth)acrylate, methoxypolyethylene glycol (meth)acrylate, and ethoxy polyethylene glycol (meth)acrylate. Among these, polyethylene glycol (meth)acrylate and methoxy polyethylene glycol (meth)acrylate are preferred.

Regarding the repeating unit (A-1), repeating units obtained by using these singly or in combination of two or more kinds thereof may be mentioned.

(Repeating Unit (A-2))

The repeating unit (A-2) is a repeating unit having an ammonioalkyl phosphate group at the terminal of a side chain. The repeating unit (A-2) is preferably a repeating unit represented by the following Formula (2):

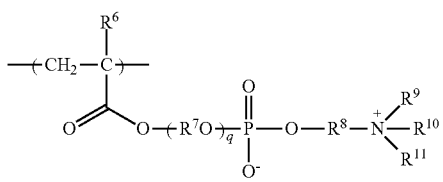

(2)

wherein in Formula (2), $R^6$ represents a hydrogen atom or a methyl group; $R^7$ represents an alkylene group having 2 to 4 carbon atoms; $R^8$ represents an alkylene group having 1 to 10 carbon atoms; $R^9$, $R^{10}$, and $R^{11}$ independently represent a hydrogen atom or a hydrocarbon group having 1 to 8 carbon atoms; and q represents 1 to 10 as an average value.

The number of carbon atoms of the alkylene group for $R^7$ is preferably 2 or 3, and more preferably 2.

The alkylene group for $R^7$ may be linear or branched, and examples thereof include the same groups listed as examples of $R^1$. Among these, from the viewpoint of having, for example, easy availability and excellent hydrophilization performance, an ethane-1,2-diyl group is preferred.

In a case in which there is a number of $R^7$'s, these $R^7$'s may be identical or different.

The number of carbon atoms of the alkylene group for $R^8$ is preferably 1 to 6, more preferably 1 to 4, even more preferably 2 or 3, and particularly preferably 2.

The alkylene group for $R^8$ may be linear or branched, and specific suitable examples include the same groups as the examples of the alkylene group for $R^7$.

$R^9$, $R^{10}$, and $R^{11}$ are independently preferably a hydrocarbon group having 1 to 8 carbon atoms. The number of carbon atoms of such a hydrocarbon group is preferably 1 to 4, more preferably 1 or 2, and particularly preferably 1.

Examples of the hydrocarbon group include an alkyl group; an aryl group such as a phenyl group; and an aralkyl group such as a benzyl group; however, an alkyl group is preferred.

This alkyl group may be linear or branched, and specific suitable examples thereof include a methyl group, an ethyl group, a n-propyl group, an isopropyl group, a n-butyl group, an isobutyl group, a sec-butyl group, and a tert-butyl group.

q is preferably 1 to 7 as an average value, more preferably 1 to 4 as an average value, and particularly preferably 1.

The repeating unit (A-2) may have a counterion such as an alkali metal ion such as sodium ion or potassium ion; an alkaline earth metal ion such as calcium ion or magnesium ion; an ammonium ion; hydride ion; or hydroxide ion.

Examples of the monomer from which such a repeating unit (A-2) is derived include
2-(meth)acryloyloxyethyl-2'-(trimethylammonio)Ethyl phosphate (2-(meth)acryloyloxyethyl phosphorylcholine),
3-(meth)acryloyloxypropyl-2'-(trimethylammonio)ethyl phosphate,
4-(meth)acryloyloxybutyl-2'-(trimethylammonio)ethyl phosphate,
2-(meth)acryloyloxyethoxyethyl-2'-(trimethylammonio) ethyl phosphate,
2-(meth)acryloyloxydiethoxyethyl-2'-(trimethylammonio) ethyl phosphate,
2-(meth)acryloyloxyethyl-2'-(triethylammonio)ethyl phosphate, and
2-(meth)acryloyloxyethyl-2'-(tributylammonio)ethyl phosphate.

Regarding the repeating unit (A-2), repeating units obtained by using these singly or in combination of two or more kinds thereof may be mentioned.

(Repeating Unit (A-3))

The repeating unit (A-3) is a repeating unit having an amide group in a side chain. The repeating unit (A-3) is preferably a repeating unit represented by the following Formula (3):

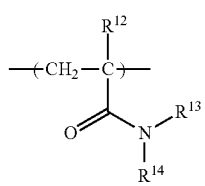

(3)

wherein in Formula (3), $R^{12}$ represents a hydrogen atom or a methyl group; and $R^{13}$ and $R^{14}$ independently represent a hydrogen atom, an alkyl group having 1 to 6 carbon atoms, or a hydroxyalkyl group having 1 to 6 carbon atoms.

The number of carbon atoms of the alkyl group for $R^{13}$ and $R^{14}$ is preferably 1 to 3.

The alkyl group may be linear or branched, and specific suitable examples include a methyl group, an ethyl group, a n-propyl group, and an isopropyl group.

The number of carbon atoms of the hydroxyalkyl group for $R^{13}$ and $R^{14}$ is preferably 1 to 6, and more preferably 1 to 3. The alkyl group contained in the hydroxyalkyl group may be linear or branched, and specific suitable examples of the hydroxyalkyl group include a hydroxymethyl group, a hydroxyethyl group, a hydroxypropyl group, and a hydroxyisopropyl group. Note that the position of substitution of the hydroxyl group in the hydroxyalkyl group is arbitrary.

Examples of the monomer from which such a repeating unit (A-3) is derived include dimethyl (meth)acrylamide, diethyl (meth)acrylamide, N-isopropyl (meth)acrylamide, N-(hydroxymethyl) (meth)acrylamide, and N-(2-hydroxyethyl) (meth)acrylamide. Examples of the repeating unit (A-3) include repeating units obtained by using these singly or in combination of two or more kinds thereof.

(Repeating Unit (A-4))

The repeating unit (A-4) is a repeating unit having a heterocyclic ring containing nitrogen and oxygen, at the terminal of a side chain. The repeating unit (A-4) is preferably a repeating unit represented by the following Formula (4):

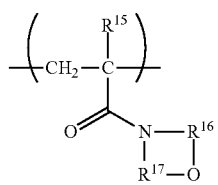

(4)

wherein in Formula (4), $R^{15}$ represents a hydrogen atom or a methyl group; and $R^{16}$ and $R^{17}$ independently represent an alkylene group having 1 to 3 carbon atoms.

The number of carbon atoms of the alkylene group for $R^{16}$ and $R^{17}$ is preferably 1 or 2.

Furthermore, the alkylene group may be linear or branched; however, a linear alkylene group is preferred.

Specific suitable examples include a methane-1,1-diyl group and an ethane-1,2-diyl group.

Examples of the monomer from which such a repeating unit (A-4) is derived include 4-(meth)acryloylmorpholine.

Examples of the repeating unit (A-4) include repeating units obtained by using the monomers singly or in combination of two or more kinds thereof.

(Repeating Unit (A-5))

The repeating unit (A-5) is a repeating unit having a lactam in a side chain. The repeating unit (A-5) is preferably a repeating unit represented by the following Formula (5):

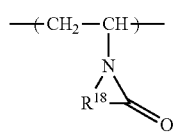

(5)

wherein in Formula (5), $R^{18}$ represents an alkylene group having 1 to 5 carbon atoms.

The number of carbon atoms of the alkylene group for $R^{18}$ is preferably 3 to 5.

The alkylene group may be linear or branched; however, a linear alkylene group is preferred. Specific suitable examples include a propane-1,3-diyl group, a butane-1,4-diyl group, and a pentane-1,5-diyl group.

Examples of the monomer from which such a repeating unit (A-5) is derived include 1-vinyl-2-pyrrolidone and N-vinyl-ε-caprolactam.

Examples of the repeating unit (A-5) include repeating units obtained by using these singly or in combination of two or more kinds thereof.

(Repeating Unit (A-6))

The repeating unit (A-6) is a repeating unit having a betainic group at the terminal of a side chain. The repeating unit (A-6) is preferably a repeating unit represented by the following Formula (6):

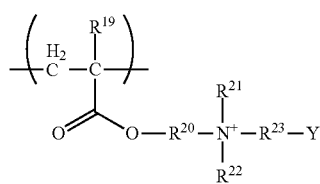

(6)

wherein in Formula (6), Y represents —(C=O)O—, —(O=S=O)O—, —O(O=S=O)O—, —(S=O)O—, —O(S=O)O—, —OP(=O)(OR$^{24}$)O—, —OP(=O)(R$^{24}$)O—, —P(=O)(OR$^{24}$)O—, —P(=O)(R$^{24}$)O— or (wherein R$^{24}$ represents an alkyl group having 1 to 3 carbon atoms); $R^{19}$ represents a hydrogen atom or a methyl group; $R^{20}$ represents a divalent organic group having 1 to 10 carbon atoms; $R^{21}$ and $R^{22}$ independently represent a hydrocarbon group having 1 to 10 carbon atoms; and $R^{23}$ represents a divalent organic group having 1 to 10 carbon atoms.

Y is preferably —(C=O)O—. Examples of the alkyl group for $R^{24}$ include a methyl group, an ethyl group, a n-propyl group, and an isopropyl group.

The number of carbon atoms of the divalent organic group for $R^{20}$ and $R^{23}$ is preferably 1 to 8, and more preferably 1 to 6.

The divalent organic group is preferably a divalent hydrocarbon group, and more preferably a divalent aliphatic hydrocarbon group. The divalent aliphatic hydrocarbon group may be linear or branched. Also, regarding the divalent aliphatic hydrocarbon group, an alkanediyl group is preferred. Examples of the divalent aliphatic hydrocarbon group include a methane-1,1-diyl group, an ethane-1,2-diyl group, a propane-1,1-diyl group, a propane-1,2-diyl group, a propane-1,3-diyl group, a propane-2,2-diyl group, a butane-1,4-diyl group, a pentane-1,5-diyl group, and a hexane-1,6-diyl group.

The number of carbon atoms of the hydrocarbon group for $R^{21}$ and $R^{22}$ is preferably 1 to 6, and more preferably 1 to 4.

Examples of the hydrocarbon group for $R^{21}$ and $R^{22}$ include an alkyl group; an aryl group such as a phenyl group; and an aralkyl group such as a benzyl group; however, an alkyl group is preferred. The alkyl group may be linear or branched, and examples thereof include a methyl group, an ethyl group, an n-propyl group, an isopropyl group, an n-butyl group, anisobutyl group, a sec-butyl group, and a tert-butyl group.

The repeating unit (A-6) may have a counterion such as an alkali metal ion such as sodium ion or potassium ion; an alkaline earth metal ion such as calcium ion or magnesium ion; an ammonium ion; hydride ion; or hydroxide ion.

Examples of the monomer from which such a repeating unit (A-6) is derived include a (meth)acrylate-based monomer such as N-(meth)acryloyloxyethyl-N,N-dimethylammonium-α-N-methylcarboxybetaine and N-(meth)acryloyloxyethyl-N,N-dimethylammonium-α-N-propylsulfobetaine.

Examples of the repeating unit (A-6) include repeating units obtained by using these singly or in combination of two or more kinds thereof.

(Repeating Unit (A-7))

The repeating unit (A-7) is an anionic repeating unit.

Examples of the repeating unit (A-7) include a repeating unit having an acidic group.

The repeating unit (A-7) is preferably a unit derived from a monomer containing an ethylenically unsaturated bond, from the viewpoints of, for example, the ease of introduction and excellent safety.

Examples of the acidic group include a carboxyl group, a sulfo group, a phosphate group, and a group of a salt thereof. The repeating unit may have one of these, or two or more of these. Note that examples of the salts include alkali metal salts such as a sodium salt and a potassium salt; alkaline earth metal salts such as a magnesium salt and a calcium salt; an ammonium salt; and an organic ammonium salt.

Examples of the monomer from which the repeating unit (A-7) is derived include an unsaturated dicarboxylic acid such as fumaric acid, maleic acid and itaconic acid, or a salt thereof; an unsaturated carboxylic acid such as (meth)acrylic acid, or a salt thereof; a sulfo group-containing polymerizable unsaturated monomer such as ethylenesulfonic acid, allylsulfonic acid, methallyl sulfonic acid, 2-sulfoethyl (meth)acrylate, and 2-acrylamido-2-methylpropanesulfonic acid, or a salt thereof; and a phosphoric acid group-containing polymerizable unsaturated monomer such as 2-(meth)acryloyloxyethyl acid phosphate and 2-(meth)acryloyloxypropyl acid phosphate, or a salt thereof. The repeating unit (A-7) can also be obtained using, for example, a hydrolysate of an acrylic acid ester; a hydrolysate of an acid anhydride of an unsaturated dicarboxylic acid, such as maleic anhydride or itaconic anhydride; or an adduct of an acidic group-containing thiol to an epoxy group of glycidylmethacrylate or (4-vinylbenzyl) glycidyl ether.

Among these, from the viewpoints of the ease of introduction and excellent reactivity, (meth)acrylic acid is preferred.

Examples of the repeating unit (A-7) include repeating units obtained by using these singly or in combination of two or more kinds thereof.

(Repeating Unit (A-8))

The repeating unit (A-8) is a cationic repeating unit. The repeating unit (A-8) is preferably a repeating unit represented by the following Formula (8):

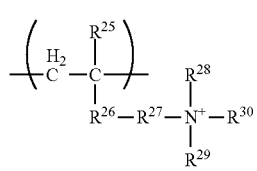

(8)

wherein in Formula (8), $R^{25}$ represents a hydrogen atom or a methyl group; $R^{26}$ represents —O—, (C=O)—O—, *—(C=O)—NR$^{31}$—, *—NR$^{31}$—(C=O)— (wherein $R^{31}$ represents a hydrogen atom or an organic group having 1 to 10 carbon atoms; and the symbol * represents the position of bonding to the carbon atom in Formula (8), to which $R^{25}$ is bonded), or a phenylene group; $R^{27}$ represents a divalent organic group having 1 to 10 carbon atoms; and $R^{28}$, $R^{29}$, and $R^{30}$ independently represent a hydrocarbon group having 1 to 10 carbon atoms.

Examples of the phenylene group for $R^{26}$ include a 1,2-phenylene group, a 1,3-phenylene group, and a 1,4-phenylene group.

Furthermore, the number of carbon atoms of the organic group for $R^{31}$ is preferably 1 to 6. The organic group may be a hydrocarbon group. Examples of such a hydrocarbon group include the same groups as the groups listed as examples of $R^5$.

The number of carbon atoms of the divalent organic group for $R^{27}$ is preferably 1 to 8, and more preferably 1 to 6.

The divalent organic group is preferably a divalent hydrocarbon group, and more preferably a divalent aliphatic hydrocarbon group. The divalent aliphatic hydrocarbon group may be linear or branched. Examples of the divalent aliphatic hydrocarbon group include the same groups as the groups listed as examples of $R^{20}$ and $R^{23}$.

The number of carbon atoms of the hydrocarbon group for $R^{28}$, $R^{29}$, and $R^{30}$ is preferably 1 to 6, and more preferably 1 to 4.

Examples of the hydrocarbon group for $R^{28}$, $R^{29}$, and $R^{30}$ include the same groups as the groups listed as examples of the hydrocarbon group for $R^9$, $R^{10}$, and $R^{21}$.

The repeating unit (A-8) may have a counterion. Examples of the counterion include a halogen ion such as chloride ion, bromide ion, or iodide ion; hydrogen sulfate ion; an alkylsulfate ion such as methylsulfate ion or ethylsulfate ion; an alkylsulfonate ion; an arylsulfonate ion such as dodecyl benzenesulfonate ion or para-tolueneulfonate ion; an alkenyl sulfate ion such as sodium 2-methyl-2-propene-1-sulfonate; and a carboxylic acid ion such as acetate ion.

Specific suitable examples of the monomer from which the repeating unit (A-8) is derived include a (meth)acrylate and a (meth)acrylamide.

Examples of the monomer species of (meth)acrylate include a ((meth)acryloyloxy-$C_{1-10}$ alkyl)-tri-$C_{1-10}$ alkylammonium chloride such as ((meth)acryloyloxyethyl)trithylammonium chloride; and a ((meth)acryloyloxy-$C_{1-10}$ alkyl)-di-$C_{1-10}$ alkyl-$C_{6-10}$ aralkylammonium chloride such as ((meth)acryloyloxyethyl)dimethylbenzylammonium chloride. Examples of the monomer species of (meth)acrylamide include (3-(meth)acrylamido-$C_{1-10}$ alkyl)-tri-$C_{1-10}$ alkylammonium chloride such as (3-(meth)acrylamidopropyl)trimethylammonium chloride; and (3-(meth)acrylamido-$C_{1-10}$ alkyl)-di-$C_{1-10}$ alkyl-$C_{6-10}$ aralkylammonium chloride such as (3-(meth)acrylamidopropyl)dimethylbenzylammonium chloride. Among these, from the viewpoints of, for example, the ease of introduction and excellent reactivity, (3-(meth)acrylamidopropyl)trimethylammonium chloride is preferred.

Examples of the repeating unit (A-8) include repeating units obtained by using these singly or in combination of two or more kinds thereof.

Among the repeating units (A-1) to (A-8), from the viewpoint of having excellent hydrophilization performance and an excellent lubricity imparting effect, the repeating unit (A-1), repeating unit (A-2), repeating unit (A-3), repeating unit (A-4), and repeating unit (A-6) are preferred, and the repeating unit (A-1), repeating unit (A-2), repeating unit (A-3), and repeating unit (A-6) are more preferred. Among them, regarding the repeating unit (A), the following (i) and (ii) are preferred, and (ii) is particularly preferred, from the viewpoint of having excellent hydrophilization performance and an excellent lubricity imparting effect:

(i) one or more selected from the group consisting of the repeating units (A-1) and (A-3), and preferably the repeating unit (A-3); and (ii) a combination of one or more selected from the group consisting of the repeating units (A-1) and (A-3), and one or more selected from the group consisting of the repeating units (A-2) and (A-6), and preferably a combination of the repeating unit (A-3) and one or more selected from the group consisting of the repeating units (A-2) and (A-6).

The total content of the repeating unit (A) is preferably 2.5% to 95% by mass with respect to all the repeating units of the polymer, and from the viewpoint of having excellent hydrophilization performance for a device and an excellent lubricity imparting effect, the total content is more preferably 5% to 95% by mass, even more preferably 20% to 95% by mass, still more preferably 30% to 95% by mass, and particularly preferably 40% to 90% by mass.

The content of the repeating unit (A) can be measured by, for example, $^1$H-NMR or $^{13}$C-NMR.

(Repeating Unit (B))

The repeating unit (B) is a repeating unit having a polyoxyalkylene group in a side chain, the terminal of the side chain being composed of an alkyl group having 5 to 30 carbon atoms, an alkanoyl group having 5 to 30 carbon atoms, or an aryl group having 6 to 30 carbon atoms. The polymer may have one kind or two or more kinds of repeating units corresponding to the repeating unit (B).

When the polymer contains such a repeating unit (B) the attaching power of the polymer to a device, particularly a silicone-containing device, or a device made of a silicone hydrogel, is increased, and as a result of an interaction with the repeating unit (A), a medical device having excellent surface hydrophilicity and lubricity, and a medical device having excellent sustainability of these effects, can be easily obtained.

Such a repeating unit (B) is preferably a repeating unit derived from a monomer having an ethylenically unsaturated bond from the viewpoint of, for example, the ease of synthesis, and a repeating unit having a structural unit represented by the following Formula (b1) at the terminal of a side chain is preferred. Regarding the repeating unit having a structural unit represented by Formula (b1) at the terminal of a side chain, known repeating units may be mentioned, and above all, for example, a (meth)acrylate-based repeating unit, a (meth)acrylamide-based repeating unit, and a styrene-based repeating unit are preferred. Among these, a repeating unit represented by the following Formula (b2) is preferred.

(b1)

wherein in Formula (b1), $R^{32}$ represents an alkylene group having 2 to 4 carbon atoms; $R^{33}$ represents an alkyl group having 5 to 30 carbon atoms, an alkanoyl group having 5 to 30 carbon atoms, or an aryl group having 6 to 30 carbon atoms; and m represents 2 to 100 as an average value.

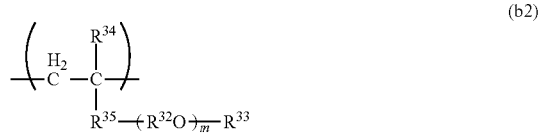
(b2)

wherein in Formula (b2), $R^{32}$, $R^{33}$, and m have the same meanings as $R^{32}$, $R^{33}$, and m in Formula (b1), respectively; $R^{34}$ represents a hydrogen atom or a methyl group; and $R^{35}$ represents —O—, —(C=O)—O—, —(C=O)—$NR^{36}$—, —$NR^{36}$—(C=O)— (wherein $R^{36}$ represents a hydrogen atom or an organic group having 1 to 10 carbon atoms; and  represents the position of bonding to the carbon atom in Formula (b2), to which $R^{34}$ is bonded), or a phenylene group).

The number of carbon atoms of the alkylene group for $R^{32}$ is preferably 2 or 3, and more preferably 2.

The alkylene group represented by $R^{32}$ may be linear or branched, and specific examples include an ethane-1,2-diyl group, a propane-1,2-diyl group, a propane-1,3-diyl group, a propane-2,2-diyl group, a butane-1,2-diyl group, butane-1,3-diyl group, and a butane-1,4-diyl group. Among these, from the viewpoint of, for example, easy availability, an ethane-1,2-diyl group is preferred.

m units of $R^{32}$ may be identical or different.

The number of carbon atoms of the alkyl group and the alkanoyl group for $R^{33}$ is preferably 6 to 25, more preferably 7 to 20, even more preferably 8 to 18, still more preferably 9 to 18, and particularly preferably 10 to 18, from the viewpoint of, for example, easy availability.

The alkyl group for $R^{33}$ may be linear or branched, and specific examples include a 2-ethylhexyl group, an octyl group, a decyl group, a lauryl group, a palmityl group, and a stearyl group. Among these, a 2-ethylhexyl group, a lauryl group, and a stearyl group are preferred, and a lauryl group and a stearyl group are more preferred.

Examples of the alkanoyl group for $R^{33}$ include a 2-ethylhexanoyl group, a lauroyl group, and a stearoyl group.

The number of carbon atoms of the aryl group for $R^{33}$ is preferably 6 to 12. Specifically, the aryl group may be a phenyl group.

Furthermore, the aryl group may have an alkyl group having 1 to 24 carbon atoms as a substituent. The number of carbon atoms of such an alkyl group is preferably 3 to 24, and more preferably 5 to 16. Note that the position of substitution and the number of substitutions of such a substituted alkyl group are arbitrary; and a suitable number of substitutions is 1 or 2.

Furthermore, examples of an aryl group having such an alkyl group having 1 to 24 carbon atoms as a substituent include a nonylphenyl group.

Among the substituents for $R^{33}$ described above, from the viewpoint of, for example, easy availability, an alkyl group having 5 to 30 carbon atoms and an aryl group having 6 to 30 carbon atoms are preferred, and an alkyl group having 5 to 30 carbon atoms is more preferred.

Examples of the phenylene group for $R^{35}$ include a 1,2-phenylene group, a 1,3-phenylene group, and a 1,4-phenylene group.

The number of carbon atoms of the organic group for $R^{36}$ is preferably 1 to 6. The organic group may be a hydrocarbon group. Examples of such a hydrocarbon group include the same groups as the hydrocarbon groups listed as examples of $R^5$.

Among the substituents for $R^{35}$, —(C=O)—O— or a phenylene group is preferred, and —(C=O)—O— is particularly preferred.

m is preferably 2 to 90 as an average value, more preferably 4 to 90 as an average value, even more preferably 9 to 60 as an average value, and particularly preferably 10 to 40 as an average value.

Examples of the monomer from which such a repeating unit (B) is derived include 2-ethylhexyl polyethylene glycol (meth)acrylate, lauroxy polyethylene glycol (meth)acrylate, stearoxy polyethylene glycol (meth)acrylate, phenoxy polyethylene glycol (meth)acrylate, phenoxy polypropylene glycol (meth)acrylate, nonylphenoxy polypropylene glycol (meth)acrylate, 2-ethylhexylpolyethylene glycol polypropylene glycol (meth)acrylate, and nonylphenoxy polyethylene glcyol polypropylene glycol (meth)acrylate. Among these, lauroxy polyethylene glycol (meth)acrylate and stearoxy polyethylene glycol (meth)acrylate are preferred.

Examples of the repeating unit (B) include repeating units obtained by using these singly or in combination of two or more kinds thereof.

The total content of the repeating unit (B) is preferably 2.5% to 9 by mass with respect to all the repeating units of the polymer, and from the viewpoint of having superior hydrophilization performance and a superior lubricity imparting effect, the total content is more preferably 2.5% to 80% by mass, even more preferably 5% to 70% by mass, and particularly preferably 5% to 60% by mass.

Note that the content of the repeating unit (B) may be analyzed in the same manner as in the case of the content of the repeating unit (A).

[Repeating Unit (C)]

It is preferable that the polymer used in the present invention contains one or more kinds of repeating unit (C) selected from the group consisting of a repeating unit (C-1) represented by the following Formula (c1) and a repeating unit (C-2) having a group represented by the following Formula (c2) at the terminal of a side chain. When the polymer includes such a repeating unit (C), the adsorptive power of the polymer to a device becomes stronger, and the hydrophilization performance and the lubricity imparting effect are further enhanced.

(Repeating Unit (C-1))

The repeating unit (C-1) is a repeating unit represented by the following Formula (c1):

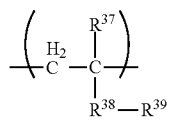
(c1)

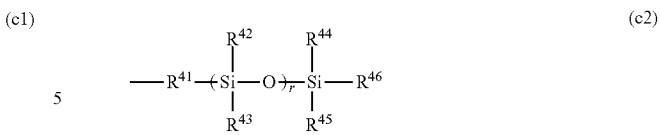
(c2)

wherein in Formula (c1), $R^{37}$ represents a hydrogen atom or a methyl group; $R^{38}$ represents —O—, *—(C=O)—O—, *—(C=O)—NR$^{40}$—, *—NR$^{40}$—(C=O)— (wherein $R^{40}$ represents a hydrogen atom or an organic group having 1 to 10 carbon atoms; and the symbol * represents the position of bonding to the carbon atom in Formula (c1), to which $R^{37}$ is bonded), or a phenylene group; and $R^{39}$ represents a hydrocarbon group having 4 to 30 carbon atoms.

Examples of the phenylene group for $R^{38}$ include a 1,2-phenylene group, a 1,3-phenylene group, and a 1,4-phenylene group.

Furthermore, the number of carbon atoms of the organic group for $R^{40}$ is preferably 1 to 6. The organic group may be a hydrocarbon group. Examples of such a hydrocarbon group include the same groups as the hydrocarbon groups listed as examples of $R^5$.

Among the substituents of $R^{38}$, from the viewpoint of having, for example, excellent hydrophilization performance, an excellent antifouling property imparting effect, and an excellent lubricity imparting effect, *—(C=O)—O—, *—(C=O)—NR$^{40}$— or a phenylene group is preferred; *—(C=O)—O— or *—(C=O)—NR$^{40}$— is more preferred; *—(C=O)—O— or *—(C=O)—NH— is even more preferred; and ***—(C=O)—NH— is particularly preferred.

The hydrocarbon group for $R^{39}$ may be either linear or branched, or may include a cyclic structure; however, the hydrocarbon group is preferably an alkyl group.

The number of carbon atoms of the hydrocarbon group for $R^{39}$ is preferably 6 to 24, more preferably 8 to 18, even more preferably 8 to 14, and particularly preferably 10 to 14, from the viewpoint of having, for example, excellent hydrophilization performance, an excellent antifouling property imparting effect, and an excellent lubricity imparting effect.

Examples of the alkyl group include a 2-ethylhexyl group, an octyl group, a decyl group, a lauryl group, a palmityl group, and a stearyl group. Among these, from the viewpoints of, for example, easy availability and an antifouling property imparting effect, a 2-ethylhexyl group, a lauryl group, and a stearyl group are preferred, and a 2-ethylhexyl group and a lauryl group are more preferred.

Examples of the monomer from which such a repeating unit (C-1) is derived include 2-ethylhexyl (meth)acrylate, lauryl (meth)acrylate, stearyl (meth)acrylate, and N-dodecyl (meth)acrylate.

Examples of the repeating unit (C-1) include repeating units obtained by using these singly or in combination of two or more kinds thereof.

(Repeating Unit (C-2))

The repeating unit (C-2) is a repeating unit represented by the following Formula (c2). Examples of the repeating unit having a group represented by Formula (c2) at the terminal of a side chain include known repeating units, and above all, for example, a (meth)acrylate-based repeating unit, a (meth) acrylamide-based repeating unit, and a styrene-based repeating unit are preferred. Among these, a repeating unit represented by the following Formula (c3) is preferred.

wherein in Formula (c2), $R^{41}$ represents a divalent organic group having 1 to 10 carbon atoms; $R^{42}$ and $R^{43}$ independently represent an organic group having 1 to 10 carbon atoms; $R^{44}$, $R^{45}$, and $R^{45}$ independently represent —OSi$(R^{49})_3$ (wherein $R^{49}$ independently represents a hydrogen atom or an organic group having 1 to 8 carbon atoms), or an organic group having 1 to 10 carbon atoms; and r represents 0 to 200 as an average value.

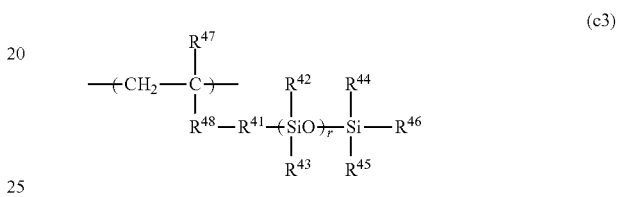
(c3)

wherein in Formula (c3), $R^{47}$ represents a hydrogen atom or a methyl group; $R^{48}$ represents *—(C=O)—O—, *—(C=O)—NR$^{50}$—, *—NR$^{50}$—(C=O)— (wherein $R^{50}$ represents a hydrogen atom or an organic group having 1 to 10 carbon atoms; and the symbol * represents the position of bonding to the carbon atom in Formula (c3), to which $R^{47}$ is bonded), or a phenylene group; and the other reference numerals have the same meanings as the reference numerals in Formula (c2), respectively.

The number of carbon atoms of the divalent organic group for $R^{41}$ is preferably 2 to 8, more preferably 2 to 6, and even more preferably 2 to 4.

The divalent organic group may be a divalent hydrocarbon group. The divalent hydrocarbon group is preferably a divalent aliphatic hydrocarbon group, and may be linear or branched; however, the divalent hydrocarbon group is more preferably an alkanediyl group. Specific suitable examples of such an alkanediyl group include an ethane-1,2-diyl group, a propane-1,2-diyl group, a propane-1,3-diyl group, a propane-2,2-diyl group, a butane-1,2-diyl group, a butane-1,3-diyl group, and a butane-1,4-diyl group.

The number of carbon atoms of the organic group for $R^{42}$ and $R^{43}$ is preferably 1 to 6, more preferably 1 to 4, and even more preferably 1 or 2.

Examples of the organic group include a hydrocarbon group. The hydrocarbon group may be linear or branched, and is preferably an alkyl group. Specific examples of such an alkyl group include a methyl group, an ethyl group, an n-propyl group, an isopropyl group, an n-butyl group, an isobutyl group, a sec-butyl group, and a tert-butyl group.

In a case in which there is a number of $R^{42}$ and $R^{43}$, $R^{42}$'s may be identical or different, and $R^{43}$'s may also be identical or different.

The number of carbon atoms of the organic group for $R^{44}$, $R^{45}$, and $R^{46}$ is preferably 1 to 6, more preferably 1 to 4, and even more preferably 1 or 2. Furthermore, examples of the organic group for $R^{44}$, $R^{45}$, $R^{46}$, and $R^{49}$ include the same groups as the organic groups for $R^{42}$ and $R^{43}$.

For $R^{44}$, $R^{45}$, and $R^{46}$, —OSi$(R^{49})_3$ is preferred from the viewpoint of having, for example, excellent hydrophilization performance. Among the substituents for $R^{49}$, from the viewpoint of the hydrophilization performance, an organic group having 1 to 8 carbon atoms is preferred, and the number of carbon atoms thereof is more preferably 1 to 6, even more preferably 1 to 4, and particularly preferably 1 or 2.

From the viewpoint of having, for example, excellent hydrophilization performance, r is preferably 0 to 100 as an average value, more preferably 0 to 50 as an average value, even more preferably 0 to 25 as an average value, and particularly preferably 0 to 10 as an average value.

Examples of the substituent for $R^{48}$ include the same groups as the substituents for $R^{38}$, and examples of the substituent for $R^{50}$ include the same groups as the substituents for $R^{40}$.

Examples of the monomer from which such a repeating unit (C-2) is derived include 3-[tris(trimethylsiloxy)silyl]propyl (meth)acrylate, 3-[bis(trimethylsiloxy) (methyl)silyl]propyl (meth)acrylate, and silicone (meth)acrylate (for example, X-22-2475 (manufactured by Shin-Etsu Silicones, Inc.) and FM-0711 (manufactured by JNC Corp.)).

Examples of the repeating unit (C-2) include repeating units obtained by using these singly or in combination of two or more kinds thereof.

Among these repeating units (C-1) to (C-2), from the viewpoint of having excellent hydrophilization performance, an excellent antifouling property imparting effect, and an excellent lubricity imparting effect, a repeating unit in which $R^{38}$ in the repeating unit (C-1) is ***—(C=O)—NH—, and a repeating unit represented by Formula (c3) are preferred.

From the viewpoint of having excellent hydrophilization performance and an excellent lubricity imparting effect, the total content of the repeating unit (C) is preferably 40% by mass or less, more preferably 0.1% to 30% by mass, even more preferably 0.5% to 20% by mass, and particularly preferably 1.0% to 10% by mass, with respect to all the repeating units of the polymer.

Note that the content of the repeating unit (C) may be measured in the same manner as in the case of the content of the repeating unit (A).

[Repeating Unit (D) for Crosslinking]

The polymer used in the present invention may be crosslinked using a crosslinking agent. In a case in which the repeating units (A) to (C) do not have a reactive functional group that reacts with a crosslinking agent, or in a case in which the repeating units are weakly reactive, and the crosslinking reaction does not sufficiently proceed, the polymer used in the present invention may contain a repeating unit (ID) having a reactive functional group in a side chain, as another repeating unit in addition to the repeating units (A) to (C), to the extent that the effects of the present invention are not impaired.

When the polymer includes the repeating unit (D), and the polymer is crosslinked on a medical device, the resistance to detachment of the polymer (crosslinked body) from the medical device becomes stronger, and an excellent lubricity imparting effect is sustained for a longer time period.

The reactive functional group is not particularly limited; however, it is preferable to select a reactive functional group having high selectivity, which, when the reactive functional group included in the repeating unit (D) is crosslinked, does not simultaneously react with a functional group that may be included in the repeating units (A) to (C), such as a carboxyl group or a hydroxyl group. A preferable reactive functional group may vary depending on whether what is selected as the repeating units (A) to (C); however, examples include an epoxy group, a carboxyl group, a hydroxyl group, an acid anhydride group, a ketone group, an aldehyde group, an isocyanate group, and an ethylenically unsaturated group. Among these, an epoxy group, a ketone group, or an ethylenically unsaturated group is preferred as the reactive functional group, from the viewpoints of the ease of introduction and reactivity.

The repeating unit (D) can be introduced by using a monomer having the above-mentioned reactive functional group. These reactive functional groups may exist singly in the monomer, or two or more kinds thereof may exist together.

Specific examples of the monomer from which the repeating unit (D) is derived include a monomer having an epoxy group in the molecule, such as glycidyl (meth)acrylate, methyl glycidyl methacrylate, or allyl glycidyl ether; a monomer having an acid anhydride group in the molecule, such as maleic anhydride, itaconic anhydride, or citraconic anhydride; a monomer having a ketone group in the molecule, such as diacetone acrylamide or acetoacetoxyethyl (meth)acrylate; a monomer having an aldehyde group in the molecule, such as (meth)acryl aldehyde, croton aldehyde, acrolein, or methacrolein; a monomer having an isocyanate group in the molecule, such as (meth)acryloyloxymethyl isocyanate, (meth)acryloyloxyethyl isocyanate, (meth)acryloyloxypropyl isocyanate, or (meth)acryloyl isocyanate; and a monomer having an ethylenically unsaturated group in the molecule, such as vinyl (meth)acrylate or allyl (meth)acrylate. The repeating unit (D) can be introduced by using these singly or in combination of two or more kinds thereof.

Among these, from the viewpoints of the ease of introduction and reactivity, glycidyl (meth)acrylate, diacetone acrylamide, acetoacetoxyethyl methacrylate, and allyl methacrylate are preferred.

[Configuration of Polymer]

The mass ratio [(A):(B)] between the repeating unit (A) and the repeating unit (B) that are included in the polymer used in the present invention is preferably 20:80 to 95:5, more preferably 30:70 to 95:5, even more preferably 40:60 to 95:5, still more preferably 50:50 to 95:5, and particularly preferably 55:45 to 95:5, from the viewpoint of having, for example, excellent hydrophilization performance and an excellent lubricity imparting effect.

In a case in which the polymer has the repeating unit (C) the mass ratio [((A)+(B)):(C)] is preferably 60:40 to 99:1, more preferably 70:30 to 99:1, even more preferably 75:25 to 99:1, still more preferably 80:20 to 99:1, and particularly preferably 85:15 to 99:1, from the viewpoint that a medical device having excellent hydrophilization performance, an excellent antifouling property imparting effect and an excellent lubricity imparting effect and having excellent transparency can be obtained.

Furthermore, it is particularly preferable that the mass ratio [(A):(B)] is in the range of the mass ratio [(A):(B)], and the mass ratio [((A)+(B)):(C)] is in the range of the mass ratio [((A)+(B)):(C)].

In a case in which the polymer has the repeating unit (D) the ratio between the repeating unit (A), repeating unit (B) and repeating unit (C), and the repeating unit (D) is not particularly limited; however, from the viewpoints of the lubricity imparting performance, enhancement of adsorbability to a medical device, and the crosslinking strength, the mass ratio ((A)+(B)+(C)):(D) is preferably 50:50 to 99:1, more preferably 80:20 to 99:1, and even more preferably 90:10 to 98:2.

The polymer used for the present invention may be a copolymer, and may be any of a block copolymer, a random copolymer and an alternating copolymer.

Regarding the weight average molecular weight (Mw) of the polymer, the lower limit is preferably 3,000, more preferably 5,000, even more preferably 8,000, and particularly preferably 10,000, and the upper limit is preferably 10,000,000, more preferably 5,000,000, even more preferably 3,000,000, and particularly preferably 2,000,000. When the weight average molecular weight is in such a range, the lubricity imparting effect, adsorbability to a device, and handleability are enhanced.

Regarding the number average molecular weight (Mn) of the polymer, the lower limit is preferably 2,000, more preferably 3,000, even more preferably 5,000, still more preferably 8,000, and particularly preferably 10,000, and the upper limit is preferably 10,000,000, more preferably 5,000,000, even more preferably 3,000,000, still more preferably 2,000,000, and particularly preferably 500,000.

Also, a molecular weight distribution (Mw/Mn) is preferably 1 to 10, more preferably 1 to 7, and particularly preferably 1 to 5.

Note that the weight average molecular weight, the number average molecular weight, and the molecular weight distribution may be measured by the method described in the following Examples.

The polymer is preferably water-soluble. When the polymer is water-soluble, a medical device having excellent surface hydrophilicity and lubricity can be easily produced, without impairing the characteristics of the device, particularly a device made of a silicone hydrogel.

According to the present specification, a water-soluble polymer implies that when the polymer is added to water (25° C.) and mixed so as to obtain a polymer concentration of 0.5% by mass, a solution that is transparent under visual inspection is obtained.

The polymer can be obtained by, for example, mixing monomers from which the various repeating units are derived, dissolving this mixture as necessary in a solvent such as water, acetonitrile, or t-butyl alcohol, adding a polymerization initiator thereto, and performing radical polymerization.

The polymerization initiator used when the radical polymerization is performed is not particularly limited as long as it is a conventional radical polymerization initiator, and examples include benzoyl peroxide, lauroyl peroxide, diisopropyl peroxydicarbonate, t-butyl peroxy-2-ethylhexanoate, t-butyl peroxypivalate, t-butyl peroxydiisobutyrate, azobisisobutyronitrile, azobisisodimethylvaleronitrile, a persulfate, and a persulfate-hydrogen sulfite-based compound.

An input amount of the polymerization initiator is preferably 0.001 to 10 parts by mass, and more preferably 0.01 to 5 parts by mass, relative to 100 parts by mass of the monomer components. Furthermore, a polymerization temperature is preferably 20° C. to 100° C., and a polymerization time is preferably 0.5 to 48 hours.

[Solution Containing Polymer]

In the production method of the present invention, a solution containing the above-mentioned polymer is used.

The content of the polymer in the solution is preferably 0.001% to 20% by mass, more preferably 0.01% to 10% by mass, and even more preferably 0.01% to 5% by mass, from the viewpoint of having excellent hydrophilization performance and an excellent lubricity imparting effect.

The solution may include, in addition to the polymer, for example, a solvent, a surfactant other than the polymer, an isotonizing agent, a chelating agent, a pH adjusting agent, a buffering agent, a thickening agent, a stabilizer, a proteolytic enzyme, a pharmacologically active component, a physiologically active component, or the various additives described in Japanese Pharmaceutical Excipients Directory 2007 (edited by International Pharmaceutical Excipients Council Japan), to the extent that the effects of the present invention are not impaired. The solution may include these singly, or in combination of two or more kinds thereof.

Examples of the solvent include water; and various buffer solutions such as a phosphate buffer solution, a glycine buffer solution, Good's buffer solution, a Tris buffer solution, and an ammonia buffer solution.

Examples of the surfactant include an amphoteric surfactant such as alkyldiaminoethylglycine or a salt thereof (for example, hydrogen chloride salt); a cationic surfactant such as benzalkonium chloride and benzethonium chloride; and an anionic surfactant such as an alkyl benzenesulfonate, an alkyl sulfate, a polyoxyethylene alkyl sulfate, an aliphatic α-sulfomethyl ester, and an α-olefin sulfonate.

Examples of the isotonizing agent include disodium hydrogen phosphate, sodium dihydrogen phosphate, potassium dihydrogen phosphate, sodium hydrogen sulfite, sodium sulfite, potassium chloride, calcium chloride, sodium chloride, magnesium chloride, potassium acetate, sodium acetate, sodium hydrogen carbonate, sodium carbonate, sodium thiosulfate, magnesium sulfate, glycerin, and propylene glycol.

Examples of the chelating agent include ethylenediaminetetraacetic acid (EDTA); salts of ethylenediaminetetraacetic acid, such as disodium ethylenediaminetetraacetate (EDTA·2Na) and trisodium ethylenediaminetetraacetate (EDTA·3Na); citric acid, gluconic acid, tartaric acid, and salts thereof (for example, sodium salt).

Examples of the pH adjusting agent include hydrochloric acid, boric acid, epsilon-aminocaproic acid, citric acid, acetic acid, sodium hydroxide, potassium hydroxide, calcium hydroxide, magnesium hydroxide, sodium hydrogen carbonate, sodium carbonate, borax, triethanolamine, monoethanolamine, diisopropanolamine, sulfuric acid, phosphoric acid, polyphosphoric acid, propionic acid, oxalic acid, gluconic acid, fumaric acid, lactic acid, tartaric acid, malic acid, succinic acid, gluconolactone, and ammonium acetate.

The pH adjusting agent may be used by adjusting the pH value of the solution to be about 4.0 to 9.0, preferably about 6.0 to 8.0, and more preferably near 7.0.

Examples of the buffering agent include acids such as citric acid, malic acid, lactic acid, ascorbic acid, maleic acid, gluconic acid, phosphoric acid, boric acid, oxycarboxylic acid, amino acids such as glycine and glutamic acid, and tris(hydroxymethyl)aminomethane (Tris), salts thereof (for example, sodium salt), Good's buffer solution containing taurine or a derivative thereof, and a hydroxyalkylamine such as bis(2-hydroxyethyl)iminotris(hydroxymethyl)methane (Bis-Tris).

Examples of the thickening agent and stabilizer include synthetic organic polymer compounds such as polyvinyl alcohol, poly-N-vinylpyrrolidone, polyethylene glycol, polypropylene glycol, and polyacrylamide; cellulose derivatives such as hydroxyethyl cellulose, hydroxypropyl cellulose, and hydroxypropylmethyl cellulose; starch derivatives such as carboxymethyl starch sodium and hydroxyethyl starch; chondroitin sulfates, and hyaluronates.

Examples of the proteolytic enzyme include proteases of biological origin, such as papain, bromelain, ficin, trypsin, chymotrypsin, and pancreatin.

Examples of the pharmacologically active component and the physiologically active component include the active ingredients for ophthalmic medicines described in the Approval Standards for Manufacturing (Import) of Non- Prescription Drugs, Year 2000 Edition (reviewed by the Pharmaceutical Affairs Study Group). Specific examples include antihistamine agents such as iproheptine, diphenhydramine hydrochloride, chlorpheniramine maleate, ketotifen fumarate, and pemirolast potassium; decongestants such as tetrahydrozoline hydrochloride, naphazoline hydrochloride, naphazoline sulfate, epinephrine hydrochloride, ephedrine hydrochloride, and methylephedrine hydrochloride; disinfectants such as cetylpyridinium, benzalkonium chloride, benzethonium chloride, chlorhexidine hydrochloride, and chlorhexidine gluconate; vitamins such as flavin adenine dinucleotide sodium, cyanocobalamin, retinal acetate, retinol palmitate, pyridoxine hydrochloride, panthenol, calcium pantothenate, and tocopherol acetate; amino acids such as potassium aspartate and magnesium aspartate; anti-inflammatory agents such as dipotassium glycyrrhizinate, pranoprofen, allantoin, azulene, sodium azulene sulfonate, guaiazulene, ε-aminocaproic acid, berberine chloride, berberine sulfate, lysozyme chloride, and licorice; as well as sodium cromoglycate, sodium chondroitin sulfate, sodium hyaluronate, sulfamethoxazole, and sodium sulfamethoxazole.

In the case of crosslinking the polymer, the solution may also include a crosslinking agent such as a polyfunctional compound capable of reacting with the functional group included in the repeating units (A) to (C) or the reactive functional group of the repeating unit (D), or a polymerization initiator.

Examples of the polyfunctional compound include a polyol, a polyfunctional amine, a polyfunctional thiol, a polyfunctional isocyanate, a hydrazide compound, and a polyfunctional ethylenically unsaturated compound. Among these, one kind may be used alone, or two or more kinds may be used together.

Examples of the polyol include a dihydric alcohol having 2 to 20 carbon atoms (an aliphatic diol [example: alkylene glycol suchasethyleneglycol, propyleneglycol, 1,3- or 1,4-butanediol, 1,6-hexanediol, or neopentyl glycol], an alicyclic diol [example: cycloalkylene glycol such as cyclohexanediol or cyclohexanedimethanol]); a trihydric alcohol having 3 to 20 carbon atoms (an aliphatic trial, for example, an alkanetriol such as glycerin, trimethylolpropane, trimethylolethane, or hexanetriol); and a polyhydric alcohol of tetravalency to octavalency or higher valency having 5 to 20 carbon atoms (an aliphatic polyol [example: alkanepolyol such as pentaerythritol, sorbitol, mannitol, sorbitan, diglycerin, or dipentaerythritol], an alkanetriol, or an intramolecular or intermolecular dehydration product of an alkanepolyol, a sugar and derivatives thereof [example: sucrose, glucose, mannose, fructose, or methylglucoside]).

Examples of the polyfunctional amine include ethylenediamine, propylenediamine, hexamethylenediamine, a dialkylenetriazine, a trialkylenetetramine, a tetraalkylenepentamine, a pentaalkylenehexamine, and a hexaalkyleneheptamine.

Examples of the polyfunctional thiol include ethylenedithiol, 1,6-hexanedithiol, and 3,6-dioxa-1,8-octanedithiol.

Examples of the polyfunctional isocyanate include 1,6-hexanemethylene diisocyanate, 2,2,4-trimethylhexamethylene diisocyanate, lysine diisocyanate, isophorone diisocyanate, 4,4'-dicyclohexylmethane diisocyanate, 1,4-cyclohexane diisocyanate, norbornane diisocyanate, 1,3- or 1,4-phenylene diisocyanate, 2,4- or 2,6-tolylene diisocyanate, and 2,4'- or 4,4'-diphenylmethane diisocyanate.

Examples of the hydrazide compound include oxalic acid dihydrazide, malonic acid dihydrazide, succinic acid dihydrazide, glutaric acid dihydrazide, adipic acid dihydrazide, sebacic acid dihydrazide, phthalic acid dihydrazide, isophthalic acid dihydrazide, terephthalic acid dihydrazide, maleic acid dihydrazide, fumaric acid dihydrazide, itaconic acid dihydrazide, citric acid trihydrazide, nitriloacetic acid trihydrazide, cyclohexanetricarboxylic acid trihydrazide, ethylenediaminetetraacetic acid tetrahydrazide, ethylene-1,2-dihydrazine, propylene-1,2-dihydrazine, propylene-1,3-dihydrazine, butylene-1,2-dihydrazine, butylene-1,3-dihydrazine, butylene-1,4-dihydrazine, and butylene-2,3-dihydrazine.

Examples of the polyfunctional ethylenically unsaturated compound include ethylene glycol di(meth)acrylate, diethylene glycol di(meth)acrylate, triethylene glycol di(meth)acrylate, polyethylene glycol di(meth)acrylate, 1,3-butylene glycol di(meth)acrylate, 1,6-hexanediol di(meth)acrylate, neopentyl glycol di(meth)acrylate, polypropylene glycol di(meth)acrylate, 2,2-bis[4-((meth)acryloxyethoxy)phenyl]propane, 2 hydroxy-1-acryloxy-3-methacryloxypropane trimethylolpropane tri(meth)acrylate, trimethylolpropane tetra(meth)acrylate, tetramethylolmethane tri(meth)acrylate, tetramethylolmethane tetra(meth)acrylate, ditrimethylolpropane tetra(meth)acrylate, triallyl cyanurate, and triallyl isocyanurate.

In a case in which a compound having an ethylenically unsaturated group is included in a solution containing the above-mentioned polymer, a polymerization initiator may be used, and regarding the polymerization initiator, a known photopolymerization initiator or a known thermal polymerization initiator can be used.

Regarding the polymerization initiator, one kind may be used alone, or two or more kinds thereof may be used together.

Examples of the photopolymerization initiator include a thioxanthone compound, an acetophenone compound, a benzyl compound, a biimidazole compound, a triazine compound, an O-acyloxime compound, an onium salt compound, a benzoin compound, a benzophenone compound, an α-diketone compound, a polynuclear quinone compound, a diazo compound, and an imidosulfonate compound.

Specific examples include 2,2-diethoxyacetophenone, 4'-isopropyl-2-hydroxy-2-methylpropiophenone, 2-hydroxy-2-methylpropiophenone, p-dimethylaminoacetone, p-tert-butyldichloroacetophenone, p-tert-butyltrichloroacetophenone, p-azidobenzalacetophenone, benzil, benzil dimethyl ketal, benzyl β-methoxyethyl acetal, 1-hydroxycyclohexyl phenyl ketone, benzoin, benzoin methyl ether, benzoin ethyl ether, benzoin n-propylether, benzoin isopropyl ether, benzoin n-butyl ether, benzoin isobutyl ether, benzophenone, methyl o-benzoylbenzoate, Michler's ketone, 4,4'-bisdiethylaminobenzophenone, 4,4'-dichlorobenzophenone, thioxanthone, 2-methylthioxanthone, 2-ethylthioxanthone, 2-isopropylthioxanthone, 4-isopropylthioxanthone, 2-chlorothioxanthone, and 2,4-diethylthioxanthone.

Examples of the thermal polymerization initiator include initiators similar to the radical polymerization initiators that may be used when the polymer is synthesized.

EXAMPLES

Hereinafter, the present invention will be described in detail by way of Examples; however, the present invention is not intended to be limited to these Examples.

The various analysis conditions were as follows.

<Measurement of Molecular Weight>

The weight average molecular weight (Mw) and the number average molecular weight (Mn) were measured by gel permeation chromatography (GPC) based on polystyrene standards using a TSKgel α-M column manufactured by Tosoh Corp, under the analysis conditions of flow rate: 0.5 milliliters/min, eluent solvent: N-methyl-2-pyrrolidone solvent ($H_3PO_4$: 0.016 M, LiBr: 0.030 M), and column temperature: 40° C.

<NMR Spectrum>

The structure (contents of repeating units) of the copolymer obtained described below was analyzed based on the $^1$H-NMR spectrum.

The $^1$H-NMR spectrum was measured with Model AVANCE500 (500 MHz) manufactured by Bruker Corp., using $d_6$-DMSO as a solvent and an internal standard substance.

[Synthesis Example 1] Synthesis of Copolymer (N-1)

8.5 g of methoxy polyethylene glycol (23) monomethacrylate (M-230G (manufactured by Shin Nakamura Chemical Co., Ltd.); hereinafter, referred to as "MPEGM". The term "polyethylene glycol (23)" means "$(OC_2H_4)_{23}$"; hereinafter, the same expression has the same meaning), 0.25 g of N-methacryloyloxyethyl-N,N-dimethylammonium-α-N-methylcarboxybetaine (GLBT (manufactured by Osaka Organic Chemical Industry, Ltd.); hereinafter referred to as "GLBT"), 1.25 g of lauroxy polyethylene glycol (30) monomethacrylate (PLE-1300 (manufactured by NOF Corp.); hereinafter, referred to as "LPEGM"), 0.1 g of 2,2'-azobis(isobutyronitrile) ((manufactured by Wako Pure Chemical Industries, Ltd.); hereinafter, referred to as "AIBN") as a polymerization initiator, and 27 g of pure water and 63 g of acetonitrile as solvents were introduced into a flask, and the mixture was mixed. Nitrogen was blown into this, the temperature was raised to 60° C., and the mixture was polymerized for 4 hours. Subsequently, the product was cooled to room temperature. The solution thus obtained was dialyzed in pure water, and thus an aqueous solution of copolymer (N-1) was obtained.

In regard to the copolymer (N-1) thus obtained, the content of the repeating unit derived from MPEGM was 85% by mass, the content of the repeating unit derived from GLBT was 2.5% by mass, and the content of the repeating unit derived from LPEGM was 12.5% by mass.

The weight average molecular weight of the copolymer (N-1) thus obtained was 235,000, the number average molecular weight was 58,000, and the molecular weight distribution was 4.1.

[Synthesis Example 2] Synthesis of Copolymer (N-2)

8.5 g of acryloylmorpholine (ACMO (manufactured by KJ Chemicals Corp.); hereinafter, referred to as "ACM"), 0.25 g of GLBT, 1.25 g of LPEGM, 0.1 g of AIBN, 27 g of pure water, and 63 g of acetonitrile were introduced into a flask, and the mixture was mixed. Nitrogen was blown into this, the temperature was raised to 60° C., and the mixture was polymerized for 4 hours. Subsequently, the product was cooled to room temperature. The solution thus obtained was dialyzed in pure water, and thus an aqueous solution of copolymer (N-2) was obtained.

In regard to the copolymer (N-2) thus obtained, the content of the repeating unit derived from ACM was 85% by mass, the content of the repeating unit derived from GLBT was 2.5% by mass, and the content of the repeating unit derived from LPEGM was 12.5% by mass.

The weight average molecular weight of the copolymer (N-2) thus obtained was 455,000, the number average molecular weight was 137,000, and the molecular weight distribution was 3.3.

[Synthesis Example 3] Synthesis of Copolymer (N-3)

8.5 g of dimethylacrylamide (DMAA (manufactured by KJ Chemicals Corp.); hereinafter, referred to as "DMA"), 0.25 g of GLBT, 1.25 g of LPEGM, 0.1 g of AIBN, 27 g of pure water, and 63 g of acetonitrile were introduced into a flask, and the mixture was mixed. Nitrogen was blown into this, the temperature was raised to 60° C., and the mixture was polymerized for 4 hours. Subsequently, the product was cooled to room temperature. The solution thus obtained was dialyzed in pure water, and thus an aqueous solution of copolymer (N-3) was obtained.

In regard to the copolymer (N-3) thus obtained, the content of the repeating unit derived from DMA was 85% by mass, the content of the repeating unit derived from GLBT was 2.5% by mass, and the content of the repeating unit derived from LPEGM was 12.5% by mass.

The weight average molecular weight of the copolymer (N-3) thus obtained was 499,000, the number average molecular weight was 125,000, and the molecular weight distribution was 4.0.

[Synthesis Example 4] Synthesis of Copolymer (N-4)

8.5 g of N-vinylpyrrolidone ((manufactured by Wako Pure Chemical Industries, Ltd.); hereinafter, referred to as "NVP"), 0.25 g of GLBT, 1.25 g of LPEGM, 0.1 g of AIBN, 27 g of pure water, and 63 g of acetonitrile were introduced into a flask, and the mixture was mixed. Nitrogen was blown into this, the temperature was raised to 60° C., and the mixture was polymerized for 4 hours. Subsequently, the product was cooled to room temperature. The solution thus obtained was dialyzed in pure water, and thus an aqueous solution of copolymer (N-4) was obtained.

In regard to the copolymer (N-4) thus obtained, the content of the repeating unit derived from NVP was 85% by mass, the content of the repeating unit derived from GLBT was 2.5% by mass, and the content of the repeating unit derived from LPEGM was 12.5% by mass.

The weight average molecular weight of the copolymer (N-4) thus obtained was 208,000, the number average molecular weight was 43,000, and the molecular weight distribution was 4.8.

[Synthesis Example 5] Synthesis of Copolymer (N-5)

8.5 g of DMA, 0.25 g of 2-methacryloyloxyethyl phosphorylcholine ((manufactured by Tokyo Chemical Industry Co., Ltd.); hereinafter, referred to as "MPC"), 1.25 g of LPEGM, 0.1 g of AIBN, 27 g of pure water, and 63 g of acetonitrile were introduced into a flask, and the mixture was mixed. Nitrogen was blown into this, the temperature was raised to 60° C., and the mixture was polymerized for 4 hours. Subsequently, the product was cooled to room temperature. The solution thus obtained was dialyzed in pure water, and thus an aqueous solution of copolymer (N-5) was obtained.

In regard to the copolymer (N-5) thus obtained, the content of the repeating unit derived from DMA was 85% by mass, the content of the repeating unit derived from MPC was 2.5% by mass, and the content of the repeating unit derived from LPEGM was 12.5% by mass.

The weight average molecular weight of the copolymer (N-5) thus obtained was 494,000, the number average molecular weight was 153,000, and the molecular weight distribution was 3.2.

[Synthesis Example 6] Synthesis of Copolymer (N-6)

8.5 g of DMA, 0.25 g of acrylic acid ((manufactured by Nippon Shokubai Co., Ltd.); hereinafter, referred to as "AA"), 1.25 g of LPEGM, 0.1 g of AIBN, 27 g of pure water, and 63 g of acetonitrile were introduced into a flask, and the mixture was mixed. Nitrogen was blown into this, the temperature was raised to 60° C., and the mixture was polymerized for 4 hours. Subsequently, the product was cooled to room temperature. 0.31 g of sodium hydrogen carbonate was added to the solution thus obtained, and the mixture was dissolved. Subsequently, the solution thus obtained was dialyzed in pure water, and thus an aqueous solution of copolymer (N-6) was obtained.

In regard to the copolymer (N-6) thus obtained, the content of the repeating unit derived from DMA was 85% by mass, the content of the repeating unit derived from AA was 2.5% by mass, and the content of the repeating unit derived from LPEGM was 12.5% by mass.

The weight average molecular weight of the copolymer (N-6) thus obtained was 436,000, the number average molecular weight was 103,000, and the molecular weight distribution was 4.2.

[Synthesis Example 7] Synthesis of Copolymer (N-7)

8.5 g of DMA, 0.25 g of dimethylaminopropylacrylamide methyl chloride quaternary salt (DMAPAA-Q (manufactured by KJ Chemicals Corp.); hereinafter, referred to as "QA"), 1.25 g of LPEGM, 0.1 g of AIBN, 27 g of pure water, and 63 g of acetonitrile were introduced into a flask, and the mixture was mixed. Nitrogen was blown into this, the temperature was raised to 60° C., and the mixture was polymerized for 4 hours. Subsequently, the product was cooled to room temperature. The solution thus obtained was dialyzed in pure water, and thus an aqueous solution of copolymer (N-7) was obtained.

In regard to the copolymer (N-7) thus obtained, the content of the repeating unit derived from DMA was 85% by mass, the content of the repeating unit derived from QA was 2.5% by mass, and the content of the repeating unit derived from LPEGM was 12.5% by mass.

The weight average molecular weight of the copolymer (N-7) thus obtained was 549,000, the number average molecular weight was 172,000, and the molecular weight distribution was 3.2.

[Synthesis Example 8] Synthesis of Copolymer (N-8)

8.75 g of MPC, 1.25 of LPEGM, 0.1 g of AIBN, and 90 g of t-butanol ((manufactured by Wako Pure Chemical Industries, Ltd.); hereinafter, referred to as "TBA") were introduced into a flask, and the mixture was mixed. Nitrogen was blown into this, the temperature was raised to 60° C., and the mixture was polymerized for 4 hours. Subsequently, the product was cooled to room temperature. The solution thus obtained was dialyzed in pure water, and thus an aqueous solution of copolymer (N-8) was obtained.

In regard to the copolymer (N-8) thus obtained, the content of the repeating unit derived from MPC was 87.5% by mass, and the content of the repeating unit derived from LPEGM was 12.5% by mass.

The weight average molecular weight of the copolymer (N-8) thus obtained was 153,000, the number average molecular weight was 39,000, and the molecular weight distribution was 3.9.

[Synthesis Example 9] Synthesis of Copolymer (N-9)

8.75 g of GLBT, 1.25 g of LPEGM, 0.1 g of AIBN, and 90 g of TBA were introduced into a flask, and the mixture was mixed. Nitrogen was blown into this, the temperature was raised to 60° C., and the mixture was polymerized for 4 hours. Subsequently, the product was cooled to room temperature. The solution thus obtained was dialyzed in pure water, and thus an aqueous solution of copolymer (N-9) was obtained.

In regard to the copolymer (N-9) thus obtained, the content of the repeating unit derived from GLBT was 87.5% by mass, and the content of the repeating unit derived from LPEGM was 12.5% by mass.

The weight average molecular weight of the copolymer (N-9) thus obtained was 197,000, the number average molecular weight was 44,000, and the molecular weight distribution was 4.5.

[Synthesis Example 10] Synthesis of Copolymer (N-10)

8.5 g of DMA, 0.25 g of GLBT, 1.25 g of stearoxy polyethylene glycol (30) monomethacrylate (PSE-1300 (manufactured by NOF Corp.); hereinafter, referred to as "SPEGM"), 0.1 g of AIBN, 27 g of pure water, and 63 g of acetonitrile were introduced into a flask, and the mixture was mixed. Nitrogen was blown into this, the temperature was raised to 60° C., and the mixture was polymerized for 4 hours. Subsequently, the product was cooled to room temperature. The solution thus obtained was dialyzed in pure water, and thus an aqueous solution of copolymer (N-10) was obtained.

In regard to the copolymer (N-10) thus obtained, the content of the repeating unit derived from DMA was 85% by mass, the content of the repeating unit derived from GLBT was 2.5% by mass, and the content of the repeating unit derived from SPEGM was 12.5% by mass.

The weight average molecular weight of the copolymer (N-10) thus obtained was 484,000, the number average molecular weight was 122,000, and the molecular weight distribution was 4.0.

[Synthesis Example 11] Synthesis of Copolymer (N-11)

8.5 g of DMA, 0.25 g of GLBT, 1.0 g of LPEGM, 0.25 g of 2-ethylhexyl acrylate ((manufactured by Tokyo Chemical Industry Co., Ltd.); hereinafter, referred to as "EHA"), 0.1 g of AIBN, 27 g of pure water, and 63 g of acetonitrile were introduced into a flask, and the mixture was mixed. Nitrogen was blown into this, the temperature was raised to 60° C., and the mixture was polymerized for 4 hours. Subsequently, the product was cooled to room temperature.

12.5 g of methyl isobutyl ketone ((manufactured by Wako Pure Chemical Industries, Ltd.); hereinafter, referred to as "MIBK") and 87.5 g of acetone (manufactured by Wako Pure Chemical Industries, Ltd.) were added to the solution thus obtained, and the mixture was stirred, and then the mixture was left to stand for 1 hour at room temperature. Thereby, the solution was partitioned into a lower layer containing the copolymer (N-11) and an upper layer. The upper layer was removed, and then a similar operation was carried out again, to thereby remove the upper layer. 75 g of MIBK was added to the remaining copolymer (N-11) layer, and the mixture was stirred to become uniform. Furthermore, 75 g of diisopropyl ether ((manufactured by Tokyo Chemical Industry Co., Ltd.); hereinafter, referred to as "DIPE") was added thereto, the mixture was stirred, and thus copolymer (N-11) was precipitated out. Filtration and vacuum drying for 8 hours at 40° C. were carried out, and thus copolymer (N-11) was obtained.

In regard to the copolymer (N-11) thus obtained, the content of the repeating unit derived from DMA was 85% by mass, the content of the repeating unit derived from GLBT was 2.5% by mass, the content of the repeating unit derived from LPEGM was 10% by mass, and the content of the repeating unit derived from EHA was 2.5% by mass.

The weight average molecular weight of the copolymer (N-11) thus obtained was 513,000, the number average molecular weight was 145,000, and the molecular weight distribution was 3.5.

[Synthesis Example 12] Synthesis of Copolymer (N-12)

8.5 g of DMA, 0.25 g of GLBT, 1.0 g of LPEGM, 0.25 g of lauryl methacrylate (LIGHT ESTER L (manufactured by Kyoeisha Chemical Co., Ltd.); hereinafter, referred to as "LMA"), 0.1 g of AIBN, and 90 g of TBA were introduced into a flask, and the mixture was mixed. Nitrogen was blown into this, the temperature was raised to 60° C., and the mixture was polymerized for 4 hours. Subsequently, the product was cooled to room temperature.

100 g of MIBK was added to the solution thus obtained, and the mixture was stirred to become uniform. The polymerization solution diluted with MIBK was added dropwise, while stirring, to a container containing 1,100 g of DIPE, and thus copolymer (N-12) was precipitated. Filtration and vacuum drying for 8 hours at 40° C. were carried out, and thus copolymer (N-12) was obtained.

In regard to the copolymer (N-12) thus obtained, the content of the repeating unit derived from DMA was 85% by mass, the content of the repeating unit derived from GLBT was 2.5% by mass, the content of the repeating unit derived from LPEGM was 10% by mass, and the content of the repeating unit derived from LMA was 2.5% by mass.

The weight average molecular weight of the copolymer (N-12) thus obtained was 465,000, the number average molecular weight was 119,000, and the molecular weight distribution was 3.9.

[Synthesis Example 13] Synthesis of Copolymer (N-13)

8.5 g of DMA, 0.25 g of GLBT, 1.0 g of LPEGM, 0.25 g of dodecylacrylamide ((manufactured by Tokyo Chemical Industry Co., Ltd.); hereinafter, referred to as "DDAA"), 0.1 g of AIBN, 27 g of water, and 63 g of acetonitrile were introduced into a flask, and the mixture was mixed. Nitrogen was blown into this, the temperature was raised to 60° C., and the mixture was polymerized for 4 hours. Subsequently, the product was cooled to room temperature.

12.5 g of MIBK and 87.5 g of acetone were added to the solution thus obtained, and the mixture was stirred. Subsequently, the mixture was left to stand for one hour at room temperature, and thereby the solution was partitioned into a lower layer containing the copolymer (N-13) and an upper layer. The upper layer was removed, and then a similar operation was performed again to remove the upper layer. 75 g of MIBK was added to the remaining copolymer (N-13) layer, and the mixture was stirred to become uniform. 75 g of DIPE was added thereto, the mixture was stirred, and thus copolymer (N-13) was precipitated. Filtration and vacuum drying for 8 hours at 40° C. were carried out, and thus copolymer (N-13) was obtained.

In regard to the copolymer (N-13) thus obtained, the content of the repeating unit derived from DMA was 85% by mass, the content of the repeating unit derived from GLBT was 2.5% by mass, the content of the repeating unit derived from LPEGM was 10% by mass, and the content of the repeating unit derived from DDAA was 2.5% by mass.

The weight average molecular weight of the copolymer (N-13) thus obtained was 497,000, the number average molecular weight was 130,000, and the molecular weight distribution was 3.8.

[Synthesis Example 14] Synthesis of Copolymer (N-14)

8.5 g of DMA, 0.25 g of GLBT, 1.0 g of LPEGM, 0.25 g of a silicone methacrylate represented by the following Formula (X) ((manufactured by Tokyo Chemical Industry Co., Ltd.); hereinafter, referred to as "SiMA"), 0.1 g of AIBN, 27 g of pure water, and 63 g of acetonitrile were introduced into a flask, and the mixture was mixed. Nitrogen was blown into this, the temperature was raised to 60° C., and the mixture was polymerized for 4 hours. Subsequently, the product was cooled to room temperature.

12.5 g of MIBK and 87.5 g of acetone were added to the solution thus obtained, and the mixture was stirred. Subsequently, the mixture was left to stand for one hour at room temperature, and thereby the solution was partitioned into a lower layer containing the copolymer (N-14) and an upper layer. The upper layer was removed, and then a similar operation was performed again to remove the upper layer. 75 g of MIBK was added to the remaining copolymer (N-14) layer, and the mixture was stirred to become uniform. 75 g of DIPE was further added thereto, the mixture was stirred, and thus copolymer (N-14) was precipitated. Filtration and vacuum drying for 8 hours at 40° C. were carried out, and thus copolymer (N-14) was obtained.

In regard to the copolymer (N-14) thus obtained, the content of the repeating unit derived from DMA was 85% by mass, the content of the repeating unit derived from GLBT was 2.5% by mass, the content of the repeating unit derived from LPEGM was 10% by mass, and the content of the repeating unit derived from SiMA was 2.5% by mass.

The weight average molecular weight of the copolymer (N-14) thus obtained was 462,000, the number average molecular weight was 108,000, and the molecular weight distribution was 4.3.

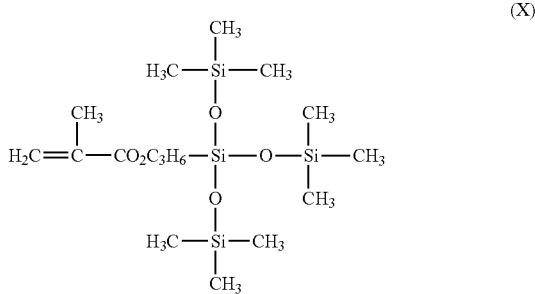

(X)

[Synthesis Example 15] Synthesis of Copolymer (N-15)

8.5 g of DMA, 0.25 g of GLBT, 1.0 g of LPEGM, 0.25 g of a silicone methacrylate (SILAPLANE FM-0711 (manufactured by JNC Corp.); hereinafter, referred to as "DMSMA"), 0.1 g of AIBN, 27 g of pure water, and 63 g of acetonitrile were introduced into a flask. Nitrogen was blown into this, the temperature was raised to 60° C., and the mixture was polymerized for 4 hours. Subsequently, the product was cooled to room temperature.

12.5 g of MIBK and 87.5 g of acetone were added to the solution thus obtained, the mixture was stirred, and then the mixture was left to stand for one hour at room temperature. Thereby, the solution was partitioned into a lower layer containing copolymer (N-15) and an upper layer. The upper layer was removed, and then a similar operation was performed again to remove the upper layer. 75 g of MIBK was added to the remaining copolymer (N-15) layer, and the mixture was stirred to become uniform. 75 g of DIPE was added thereto, the mixture was stirred, and thus copolymer (N-15) was precipitated. Filtration and vacuum drying for 8 hours at 40° C. were carried out, and thus copolymer (N-15) was obtained.

In regard to the copolymer (N-15) thus obtained, the content of the repeating unit derived from DMA was 85% by mass, the content of the repeating unit derived from GLBT was 2.5% by mass, the content of the repeating unit derived from LPEGM was 10% by mass, and the content of the repeating unit derived from DMSMA was 2.5% by mass.

The weight average molecular weight of the copolymer (N-15) thus obtained was 497,000, the number average molecular weight was 103,000, and the molecular weight distribution was 4.8.

[Synthesis Example 16] Synthesis of Copolymer (N-16)

7.75 g of DMA, 0.5 g of GLBT, 1.0 g of LPEGM, 0.25 g of DDAA, 0.5 g of diacetoneacrylamide ((manufactured by Nippon Kasei Chemical Co., Ltd.); hereinafter, referred to as "DAAM"), 0.1 g of AIBN, 27 g of pure water, and 63 g of acetonitrile were introduced into a flask, and the mixture was mixed. Nitrogen was blown into this, the temperature was raised to 60° C., and the mixture was polymerized for 4 hours. Subsequently, the product was cooled to room temperature.

12.5 g of MIBK and 87.5 g of acetone were added to the solution thus obtained, the mixture was stirred, and then the mixture was left to stand for one hour at room temperature. Thereby, the solution was partitioned into a lower layer containing copolymer (N-16) and an upper layer. The upper layer was removed, and then a similar operation was performed again to remove the upper layer. 75 g of MIBK was added to the remaining copolymer (N-16) layer, and the mixture was stirred to become uniform. 75 g of DIPE was added thereto, the mixture was stirred, and thus copolymer (N-16) was precipitated. Filtration and vacuum drying for 8 hours at 40° C. were carried out, and thus copolymer (N-16) was obtained.

In regard to the copolymer (N-16) thus obtained, the content of the repeating unit derived from DMA was 77.5% by mass, the content of the repeating unit derived from GLBT was 5% by mass, the content of the repeating unit derived from LPEGM was 10% by mass, the content of the repeating unit derived from DDAA was 2.5% by mass, and the content of the repeating unit derived from DAAM was 5% by mass.

The weight average molecular weight of the copolymer (N-16) thus obtained was 408,000, the number average molecular weight was 106,000, and the molecular weight distribution was 3.8.

[Reference Example 1] Synthesis of Copolymer (N-17)

8.5 g of DMA, 0.25 g of GLBT, 1.25 g of EHA, 0.1 g of AIBN, 27 g of pure water, and 63 g of acetonitrile were introduced into a flask, and the mixture was mixed. Nitrogen was blown into this, the temperature was raised to 60° C., and the mixture was polymerized for 4 hours. Subsequently, the product was cooled to room temperature. The solution thus obtained was dialyzed in pure water, and thus an aqueous solution of copolymer (N-17) was obtained.

In regard to the copolymer (N-17) thus obtained, the content of the repeating unit derived from DMA was 85% by mass, the content of the repeating unit derived from GLBT was 2.5% by mass, and the content of the repeating unit derived from EHA was 12.5% by mass.

The weight average molecular weight of the copolymer (N-17) thus obtained was 398,000, the number average molecular weight was 95,000, and the molecular weight distribution was 4.2.

[Reference Example 2] Synthesis of Copolymer (N-18)

8.5 g of DMA, 0.25 g of GLBT, 1.25 g of LMA, 0.1 g of AIBN, 27 g of pure water, and 63 g of acetonitrile were introduced into a flask, and the mixture was mixed. Nitrogen was blown into this, the temperature was raised to 60° C., and the mixture was polymerized for 4 hours. Subsequently, the product was cooled to room temperature. The solution thus obtained was reprecipitated in pure water, and the precipitate was dried. Thus, copolymer (N-18) was obtained.

In regard to the copolymer (N-18) thus obtained, the content of the repeating unit derived from DMA was 85% by mass, the content of the repeating unit derived from GLBT was 2.5% by mass, and the content of the repeating unit derived from LMA was 12.5% by mass.

The weight average molecular weight of the copolymer (N-18) thus obtained was 354,000, the number average molecular weight was 83,000, and the molecular weight distribution was 4.3.

[Reference Example 3] Synthesis of Copolymer (N-19)

8.5 g of DMA, 0.25 g of GLBT, 1.25 g of DDAA, 0.1 g of AIBN, 27 g of pure water, and 63 g of acetonitrile were introduced into a flask, and the mixture was mixed. Nitrogen was blown into this, the temperature was raised to 60° C., and the mixture was polymerized for 4 hours. Subsequently, the product was cooled to room temperature. The solution thus obtained was reprecipitated in pure water, and the precipitate was dried. Thus, copolymer (N-19) was obtained.

In regard to the copolymer (N-19) thus obtained, the content of the repeating unit derived from DMA was 85% by mass, the content of the repeating unit derived from GLBT was 2.5% by mass, and the content of the repeating unit derived from DDAA was 12.5% by mass.

The weight average molecular weight of the copolymer (N-19) thus obtained was 438,000, the number average molecular weight was 101,000, and the molecular weight distribution was 4.3.

[Reference Example 4] Synthesis of Copolymer (N-20)

8.5 g of DMA, 0.25 g of GLBT, 1.25 g of SiMA, 0.1 g of AIBN, 27 g of pure water, and 63 g of acetonitrile were introduced into a flask, and the mixture was mixed. Nitrogen was blown into this, the temperature was raised to 60° C., and the mixture was polymerized for 4 hours. Subsequently, the product was cooled to room temperature. The solution thus obtained was reprecipitated in pure water, and the precipitate was dried. Thus, copolymer (N-20) was obtained.

In regard to the copolymer (N-20) thus obtained, the content of the repeating unit derived from DMA was 85% by mass, the content of the repeating unit derived from GLBT was 2.5% by mass, and the content of the repeating unit derived from SiMA was 12.5% by mass.

The weight average molecular weight of the copolymer (N-20) thus obtained was 406,000, the number average molecular weight was 81,000, and the molecular weight distribution was 5.0.

[Reference Example 5] Synthesis of Copolymer (N-21)

8.5 g of DMA, 0.25 g of GLBT, 1.25 g of DMSMA, 0.1 g of AIBN, 27 g of pure water, and 63 g of acetonitrile were introduced into a flask, and the mixture was mixed. Nitrogen was blown into this, the temperature was raised to 60° C., and the mixture was polymerized for 4 hours. Subsequently, the product was cooled to room temperature. The solution thus obtained was reprecipitated in pure water, and the precipitate was dried. Thus, copolymer (N-21) was obtained.

In regard to the copolymer (N-21) thus obtained, the content of the repeating unit derived from DMA was 85% by mass, the content of the repeating unit derived from GLBT was 2.5% by mass, and the content of the repeating unit derived from DMSMA was 12.5% by mass.

The weight average molecular weight of the copolymer (N-21) thus obtained was 360,000, the number average molecular weight was 95,000, and the molecular weight distribution was 3.8.

Each of the copolymers (N-1) to (N-21) obtained in the various Synthesis Examples and Reference Examples was mixed with purified water at 25° C. such that the concentration of each copolymer would be 0.5% by mass. The copolymers (N-1) to (N-17), (N-19), and (N-20) were dissolved in purified water.

TABLE 1

|   |   | Synthesis Example 1 N-1 | Synthesis Example 2 N-2 | Synthesis Example 3 N-3 | Synthesis Example 4 N-4 | Synthesis Example 5 N-5 | Synthesis Example 6 N-6 | Synthesis Example 7 N-7 | Synthesis Example 8 N-8 | Synthesis Example 9 N-9 | Synthesis Example 10 N-10 |
|---|---|---|---|---|---|---|---|---|---|---|---|
| A | MPEGM | 85 | | | | | | | | | |
|   | ACM | | 85 | | | | | | | | |
|   | DMA | | | 85 | | 85 | 85 | 85 | | | 85 |
|   | NVP | | | | 85 | | | | | | |
|   | MPC | | | | | 2.5 | | | 87.5 | | |
|   | GLBT | 2.5 | 2.5 | 2.5 | 2.5 | | | | | 87.5 | 2.5 |
|   | AA | | | | | | 2.5 | | | | |
|   | QA | | | | | | | 2.5 | | | |
| B | LPEGM | 12.5 | 12.5 | 12.5 | 12.5 | 12.5 | 12.5 | 12.5 | 12.5 | 12.5 | |
|   | SPEGM | | | | | | | | | | 12.5 |
| C | EHA | | | | | | | | | | |
|   | LMA | | | | | | | | | | |
|   | DDAA | | | | | | | | | | |
|   | SiMA | | | | | | | | | | |
|   | DMSMA | | | | | | | | | | |
| Mw |   | 235000 | 455000 | 499000 | 208000 | 494000 | 436000 | 549000 | 153000 | 197000 | 484000 |
| Mw/Mn |   | 4.1 | 3.3 | 4.0 | 4.8 | 3.2 | 4.2 | 3.2 | 3.9 | 4.5 | 4.0 |
| Water-solubility (0.5 mass %) |   | ○ | ○ | ○ | ○ | ○ | ○ | ○ | ○ | ○ | ○ |

|   |   | Synthesis Example 11 N-11 | Synthesis Example 12 N-12 | Synthesis Example 13 N-13 | Synthesis Example 14 N-14 | Synthesis Example 15 N-15 | Synthesis Example 16 N-16 | Reference Example 1 N-17 | Reference Example 2 N-18 | Reference Example 3 N-19 | Reference Example 4 N-20 | Reference Example 5 N-21 |
|---|---|---|---|---|---|---|---|---|---|---|---|---|
| A | MPEGM | | | | | | | | | | | |
|   | ACM | | | | | | | | | | | |
|   | DMA | 85 | 85 | 85 | 85 | 85 | 77.5 | 85 | 85 | 85 | 85 | 85 |
|   | NVP | | | | | | | | | | | |
|   | MPC | | | | | | | | | | | |
|   | GLBT | 2.5 | 2.5 | 2.5 | 2.5 | 2.5 | 5 | 2.5 | 2.5 | 2.5 | 2.5 | 2.5 |
|   | AA | | | | | | | | | | | |
|   | QA | | | | | | | | | | | |
| B | LPEGM | 10 | 10 | 10 | 10 | 10 | 10 | | | | | |
|   | SPEGM | | | | | | | | | | | |

TABLE 1-continued

| | | | | | | | | | | | | |
|---|---|---|---|---|---|---|---|---|---|---|---|---|
| C | EHA | 2.5 | | | | | | 12.5 | | | | |
| | LMA | | 2.5 | | | | | | 12.5 | | | |
| | DDAA | | | 2.5 | | 2.5 | | | | 12.5 | | |
| | SiMA | | | | 2.5 | | | | | | 12.5 | |
| | DMSMA | | | | | 2.5 | | | | | | 12.5 |
| D | DAAM | | | | | | 5 | | | | | |
| Mw | | 513000 | 465000 | 497000 | 462000 | 497000 | 408000 | 398000 | 354000 | 438000 | 406000 | 360000 |
| Mw/Mn | | 3.5 | 3.9 | 3.8 | 4.3 | 4.8 | 3.8 | 4.2 | 4.3 | 4.3 | 5.0 | 3.8 |
| Water-solubility (0.5 mass %) | | ○ | ○ | ○ | ○ | ○ | ○ | ○ | X | ○ | ○ | X |

[Production of Treatment Agent]

Each of the various copolymers (aqueous solutions) of Synthesis Example 1 to 16 and Reference Examples 1 to 5, polyvinylpyrrolidone K-90 ((manufactured by Tokyo Chemical Industry Co., Ltd.); hereinafter, referred to as "PVP"), which is a hydrophilic polymer generally used as a hydrophilizing agent for contact lenses, or POLOXAMER 407 ((manufactured by Sigma-Aldrich Co.); hereinafter, referred to as "POLOXAMER"), which is a nonionic surfactant generally used as a detergent for contact lenses, was used to prepare an aqueous solution to the aqueous solution concentrations described in Table 2. Thus, treatment agents of Examples 1 to 19 and Comparative Examples 1 to 9 were obtained. Pure water was used as the preparation solvent in all cases.

The treatment agent is a solution containing a polymer having the repeating unit (A) and the repeating unit (B).

Example 20

A 0.5 mass % aqueous solution was prepared using the copolymer (N-16) obtained in Synthesis Example 16. Furthermore, adipic acid dihydrazide was added to the aqueous solution in an amount equivalent to 1/10 of the mass of the copolymer, and was dissolved therein. Thus, a treatment agent was obtained.

[Test Example 1] Hydrophilicity Test

First, a silicone hydrogel was produced prior to the test. 50 parts by mass of SiMA, 45 parts by mass of DMA, 5 parts by mass of polyethylene glycol dimethacrylate n≈4 (manufactured by Tokyo Chemical Industry Co., Ltd.), and 1 part by mass of 2,2-dimethoxy-2-phenylacetophenone were mixed, and the mixture was poured into a Petri dish. The mixture was irradiated with UV such that the amount of UV irradiation in air was 1.5 J/cm$^2$, and thus a transparent polymerization product was obtained. The polymerization product was caused to swell in pure water, and thereby a silicone hydrogel was obtained. The silicone hydrogel thus obtained was cut into a size of φ 12 mm and a thickness of 5 mm, and then the cut silicone hydrogel was stored in pure water.

Next, the silicone hydrogel thus produced was washed three times with pure water, and then was completely immersed in 2 mL of each of the treatment agents of various Examples and Comparative Examples. The system was heated to the treatment temperature described in Table 2, and was left to stand for the treatment time described in Table 2.

In the meantime, only in Example 14, 2 mL of the treatment agent was heated to the treatment temperature described in Table 2, and once the treatment agent had reached that temperature, the silicone hydrogel thus produced was completely immersed therein, and was left to stand for the treatment time described in Table 2 at that temperature. Furthermore, the heating treatment for Examples 18 and 19 were autoclave sterilization using a HVE-50LB (manufactured by Hirayama Manufacturing Corp.). Also, only in Example 20, the silicone hydrogel was taken out from the treatment after standing for the treatment time described in Table 2, and the silicone hydrogel was heated and dried for 4 hours or longer in an oven set at 60° C. Subsequently, the silicone hydrogel was immersed in pure water for 10 minutes to swell, and thus a crosslinking treatment was performed.

Subsequently, the silicone hydrogel that had been treated with each treatment agent was washed three times with pure water. The silicone hydrogel thus treated was immersed in pure water for 10 seconds and was taken out, and then the silicone hydrogel was subjected to an evaluation according to the criteria described below. It can be said that as the grade of the evaluation criteria is higher, the hydrogel has superior surface hydrophilicity.

The test results are presented in the column for hydrophilicity in Table 2. The control in the table represents the results obtained by testing the hydrogel using pure water instead of the various treatment agents.

(Surface Hydrophilicity Evaluation Criteria)

Grades

1 . . . The surface of the silicone hydrogel is sparingly wet and repels water.

2 . . . Wetting in a half or more of the area of the silicone hydrogel surface is non-uniform, and the silicone hydrogel slightly repels water.

3 . . . A half or more of the area of the silicone hydrogel surface is uniformly wetted.

4 . . . The silicone hydrogel surface is uniformly wetted.

[Test Example 2] Lubricity Test

A silicone hydrogel produced in the same manner as in the case of the hydrophilicity test was washed three times with pure water, and then the silicone hydrogel was completely immersed in 2 mL of each of the treatment agents of the various Examples and Comparative Examples. The system was heated to the treatment temperature described in Table 2, and was left to stand for the treatment time described in Table 2. In the meantime, only in Example 14, 2 mL of the treatment agent was heated to the treatment temperature described in Table 2, and once the treatment agent had reached that temperature, the silicone hydrogel thus produced was completely immersed therein, and was left to stand for the treatment time described in Table 2 at that temperature. Furthermore, only in Example 20, a crosslinking treatment was carried out according to a similar procedure as described above. Subsequently, the silicone hydrogel that had been treated with each treatment agent was washed three times with pure water.

The silicone hydrogel after being washed was touched by five test subjects with a dry finger, and thus the silicone hydrogel was evaluated based on the average value of the grades for lubricity. Lubricity was evaluated according to the following judgment criteria.

The test results are presented in the column for lubricity in Table 2.

(Evaluation Criteria for Lubricity)

Grades

1 . . . Equivalent to the control.
2 . . . Slight lubricity is felt compared to the control.
3 . . . The hydrogel has lubricity overall, without squeaking.
4 . . . The hydrogel has high lubricity.

[Test Example 3] Test on Lubricity after Scrubbing

A silicone hydrogel produced in the same manner as in the case of the hydrophilicity test was washed three times with pure water, and then the silicone hydrogel was completely immersed in 2 mL of each of the treatments of the various Examples and Comparative Examples. The system was heated to the treatment temperature described in Table 2, and was left to stand for the treatment time described in Table 2.

was carried out according to a similar procedure as described above. Subsequently, the silicone hydrogel that had been treated with each treatment agent was rinsed by ten times of scrubbing using a commercially available contact lens cleaning solution (OPTIFREE PLUS (manufactured by Alcon Laboratories, Inc.)), and then was washed three times with a phosphate buffered saline.

The silicone hydrogel after being washed was touched by five test subjects with a dry finger, and thus the silicone hydrogel was evaluated based on the average value of the grades for lubricity. Lubricity was evaluated according to the following judgment criteria.

The test results are presented in the column for lubricity after scrubbing in Table 2.

(Lubricity Evaluation Criteria)

Grades

1 . . . Equivalent to the control.
2 . . . Slight lubricity is felt compared to the control.
3 . . . The hydrogel has lubricity overall, without squeaking.
4 . . . The hydrogel has high lubricity.

TABLE 2

| | | Polymer | Aqueous solution concentration (wt %) | Immersion of device in solution | Treatment temperature (° C.) | Treatment time (min) | Crosslinking treatment | Hydro-philicity | Lubricity | Lubricity after scrubbing |
|---|---|---|---|---|---|---|---|---|---|---|
| Control | | — | — | Before heating | 35 | 240 | — | 1 | 1.0 | 1.0 |
| Example | 1 | N-1 | 0.5 | Before heating | 35 | 240 | None | 4 | 3.0 | 2.8 |
| | 2 | N-2 | 0.5 | Before heating | 35 | 240 | None | 4 | 3.0 | 2.6 |
| | 3 | N-3 | 0.5 | Before heating | 35 | 240 | None | 4 | 3.2 | 2.8 |
| | 4 | N-4 | 0.5 | Before heating | 35 | 240 | None | 4 | 3.2 | 3.0 |
| | 5 | N-5 | 0.5 | Before heating | 35 | 240 | None | 4 | 3.0 | 2.8 |
| | 6 | N-6 | 0.5 | Before heating | 35 | 240 | None | 4 | 3.2 | 3.0 |
| | 7 | N-7 | 0.5 | Before heating | 35 | 240 | None | 4 | 3.0 | 3.0 |
| | 8 | N-8 | 0.5 | Before heating | 35 | 240 | None | 4 | 3.4 | 3.2 |
| | 9 | N-9 | 0.5 | Before heating | 35 | 240 | None | 4 | 3.4 | 3.4 |
| | 10 | N-10 | 0.5 | Before heating | 35 | 240 | None | 4 | 3.2 | 3.2 |
| | 11 | N-11 | 0.5 | Before heating | 35 | 240 | None | 4 | 3.8 | 3.8 |
| | 12 | N-12 | 0.5 | Before heating | 35 | 240 | None | 4 | 4.0 | 3.8 |
| | 13 | H-13 | 0.5 | Before heating | 35 | 240 | None | 4 | 4.0 | 3.6 |
| | 14 | N-13 | 0.5 | After heating | 35 | 240 | None | 4 | 4.0 | 4.0 |
| | 15 | N-14 | 0.5 | Before heating | 35 | 240 | None | 4 | 3.6 | 3.4 |
| | 16 | N-15 | 0.5 | Before heating | 35 | 240 | None | 3 | 3.6 | 3.6 |
| | 17 | N-16 | 0.5 | Before heating | 35 | 240 | None | 3 | 3.7 | 3.3 |
| | 18 | N-3 | 0.5 | Before heating | 120 | 20 | None | 4 | 4.0 | 3.8 |
| | 19 | N-13 | 0.5 | Before heating | 120 | 20 | None | 4 | 4.0 | 4.0 |
| | 20 | N-16 | 0.5 | Before heating | 35 | 240 | Treated (adipic acid dihydrazide) | 4 | 4.0 | 4.0 |
| Comparative Example | 1 | N-17 | 0.5 | Before heating | 35 | 240 | None | 2 | 2.0 | 1.2 |
| | 2 | N-18 | 0.5 | Before heating | 35 | 240 | None | 3 | 2.2 | 1.4 |
| | 3 | N-19 | 0.5 | Before heating | 35 | 240 | None | 3 | 2.0 | 1.4 |
| | 4 | N-3 | 0.5 | Before heating | 25 | 240 | None | 3 | 2.6 | 1.8 |
| | 5 | N-13 | 0.5 | Before heating | 25 | 240 | None | 3 | 2.6 | 2.0 |
| | 6 | PVP | 0.5 | Before heating | 35 | 240 | None | 2 | 1.4 | 1.0 |
| | 7 | PVP | 0.5 | Before heating | 120 | 20 | None | 2 | 1.8 | 1.4 |
| | 8 | POLOXAMER | 0.5 | Before heating | 35 | 240 | None | 2 | 1.8 | 1.0 |
| | 9 | POLOXAMER | 0.5 | Before heating | 120 | 20 | None | 2 | 2.0 | 1.0 |

In the meantime, only in Example 14, 2 mL of the treatment agent was heated to the treatment temperature described in Table 2, and once the treatment agent had reached the temperature, the silicone hydrogel thus produced was completely immersed therein, and was left to stand for the treatment time described in Table 2 at that temperature. Furthermore, only in Example 20, a crosslinking treatment As shown in Table 2, according to the method for producing a medical device of the present invention, a medical device having excellent hydrophilicity and lubricity could be obtained.

The invention claimed is:

1. A method for producing a medical device, the method comprising:

heating a device together with a solution comprising a polymer having the following repeating unit (A) and the following repeating unit (B); or bringing a device into contact with a heated product of a solution comprising a polymer having the following repeating unit (A) and the following repeating unit (B):

(A) hydrophilic repeating unit; and (B) a repeating unit comprising, at the terminal of a side chain, a structural unit represented by the following Formula (b1)

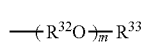

(b1)

wherein, in Formula (b1), $R^{32}$ is an alkylene group having 2 to 4 carbon atoms, $R^{33}$ is an alkyl group having 5 to 30 carbon atoms, and m represents 2 to 100 as an average value.

2. The method of claim 1, wherein the repeating unit (A) is at least one selected from the group consisting of a repeating unit (A-1) having a polyoxyalkylene group in a side chain, the terminal of the side chain being composed of a hydrogen atom or an alkyl group having 1 to 4 carbon atoms; a repeating unit (A-2) having an ammonioalkyl phosphate group at the terminal of a side chain: a repeating unit (A-3) having an amide group in a side chain: a repeating unit (A-4) having a heterocyclic ring containing nitrogen and oxygen, at the terminal of a side chain; a repeating unit (A-5) having a lactam in a side chain; a repeating unit (A-6) having a betainic group at the terminal of a side chain; an anionic repeating unit (A-7); and a cationic repeating unit (A-8).

3. The method of claim 1, wherein the repeating unit (A) is at least one selected from the group consisting of a repeating unit (A-1) represented by the following Formula (1); a repeating unit (A-2) represented by the following Formula (2); a repeating unit (A-3) represented by the following Formula (3); a repeating unit (A-4) represented by the following Formula (4); a repeating unit (A-5) represented by the following Formula (5); a repeating unit (A-6) represented by the following Formula (6); an anionic repeating unit (A-7); and a repeating unit (A-8) represented by the following Formula (8):

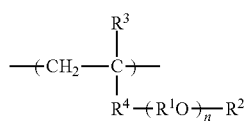

(1)

wherein, in Formula (1), $R^1$ represents an alkylene group having 2 to 4 carbon atoms; $R^2$ represents a hydrogen atom or an alkyl group having 1 to 4 carbon atoms; $R^3$ represents a hydrogen atom or a methyl group; $R^4$ represents —O—, *—(C=O)—O—, *—(C=O)—NR$^5$—, *—NR$^5$—(C=O)— wherein $R^5$ represents a hydrogen atom or an organic group having 1 to 10 carbon atoms; and the symbol * represents the position of bonding to the carbon atom in Formula (1), to which $R^3$ is bonded, or a phenylene group; and n represents 2 to 100 as an average value,

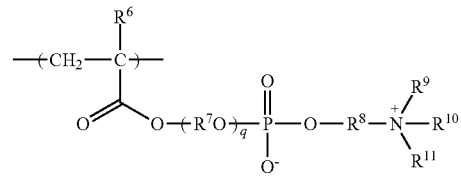

(2)

wherein, in Formula (2), $R^6$ represents a hydrogen atom or a methyl group; $R^7$ represents an alkylene group having 2 to 4 carbon atoms; $R^8$ represents an alkylene group having 1 to 10 carbon atoms; $R^9$, $R^{10}$, and $R^{11}$ independently represent a hydrogen atom or a hydrocarbon group having 1 to 8 carbon atoms; and q represents 1 to 10 as an average value,

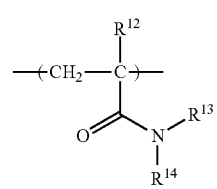

(3)

wherein, in Formula (3), $R^{12}$ represents a hydrogen atom or a methyl group; $R^{13}$ and $R^{14}$ independently represent a hydrogen atom, an alkyl group having 1 to 6 carbon atoms, or a hydroxyalkyl group having 1 to 6 carbon atoms,

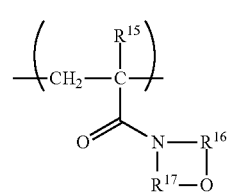

(4)

wherein, in Formula (4), $R^{15}$ represents a hydrogen atom or a methyl group; and $R^{16}$ and $R^{17}$ independently represent an alkylene group having 1 to 3 carbon atoms,

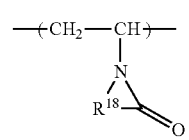

(5)

wherein, in Formula (5) $R^{18}$ represents an alkylene group having 1 to 5 carbon atoms,

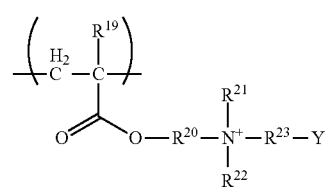

(6)

wherein, in Formula (6), Y represents —(C=O)O—, —(O=S=O)O—, —O(O=S=O)O—, —(S=O)

—O—, —O(S=O)O—, —OP(=O)(OR$^{24}$)O—, —OP(=O)(R$^{24}$)O—, —P(=O)(OR$^{24}$)O—, or —P(=O)(R$^{24}$)O— wherein R$^{24}$ represents an alkyl group having 1 to 3 carbon atoms; R$^{19}$ represents a hydrogen atom or a methyl group; R$^{20}$ represents a divalent organic group having 1 to 10 carbon atoms; R$^{21}$ and R$^{22}$ independently represent a hydrocarbon group having 1 to 10 carbon atoms; and R$^{23}$ represents a divalent organic group having 1 to 10 carbon atoms, and

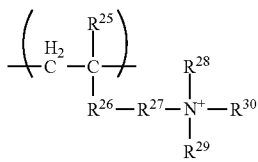

(8)

wherein, in Formula (8), R$^{25}$ represents a hydrogen atom or a methyl group; R$^{26}$ represents —O—, *—(C=O)—O—, *—(C=O)—NR$^{31}$—, *—NR$^{31}$—(C=O)— wherein R$^{31}$ represents a hydrogen atom or an organic group having 1 to 10 carbon atoms; and the symbol * represents the position of bonding to the carbon atom in Formula (8), to which R$^{25}$ is bonded, or a phenylene group; R$^{27}$ represents a divalent organic group having 1 to 10 carbon atoms; and R$^{28}$, R$^{29}$, and R$^{30}$ independently represent a hydrocarbon group having 1 to 10 carbon atoms.

4. The method of claim 1, wherein the repeating unit (B) is a repeating unit derived from a monomer having an ethylenically unsaturated bond.

5. The method of claim 1, wherein the repeating unit (B) is represented by the following Formula (b2):

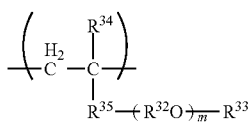

(b2)

wherein, in Formula (b2), R$^{32}$, R$^{33}$, and m are defined as in Formula (b1); R$^{34}$ represents a hydrogen atom or a methyl group; and R$^{35}$ represents —O—, —(C=O)—O—, —(C=O)—NR$^{36}$—, —NR$^{36}$—(C=O)— wherein R$^{36}$ represents a hydrogen atom or an organic group having 1 to 10 carbon atoms; and the symbol  represents the position of bonding to the carbon atom in Formula (b2), to which R$^{34}$ is bonded, or a phenylene group.

6. The method of claim 1, wherein the polymer further comprises at least one repeating unit (C) selected from the group consisting of a repeating unit (C-1) represented by the following Formula (c1), and a repeating unit (C-2) having a group represented by the following Formula (c2) at the terminal of a side chain:

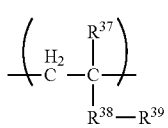

(c1)

wherein, in Formula (c1), R$^{37}$ represents a hydrogen atom or a methyl group; R$^{38}$ represents —O—, *—(C=O)—O—, *—(C=O)—NR$^{40}$—, *—NR$^{40}$—(C=O)— wherein R$^{40}$ represents a hydrogen atom or an organic group having 1 to 10 carbon atoms; and the symbol * represents the position of bonding to the carbon atom in Formula (c1), to which R$^{37}$ is bonded, or a phenylene group; and R$^{39}$ represents a hydrocarbon group having 4 to 30 carbon atoms, and

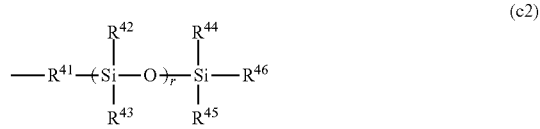

(c2)

wherein, in Formula (c2), R$^{41}$ represents a divalent organic group having 1 to 10 carbon atoms; R$^{42}$ and R$^{43}$ independently represent an organic group having 1 to 10 carbon atoms; R$^{44}$, R$^{45}$, and R$^{46}$ independently represent —OSi(R$^{49}$)$_3$ wherein R$^{49}$ independently represents a hydrogen atom or an organic group having 1 to 8 carbon atoms, or an organic group having 1 to 10 carbon atoms; and r represents 0 to 200 as an average value.

7. The method of claim 1, wherein the polymer is water-soluble.

8. The method of claim 1, wherein the device comprises a silicone.

9. The method of claim 1, wherein the device is formed from a silicone hydrogel.

10. The method of claim 1, wherein the device is a silicone hydrogel contact lens.

11. A medical device produced by the method of claim 1.

12. A medical device comprising, at least in a portion of the surface, a part formed from a heated product of a solution comprising a polymer having the following repeating unit (A) and the following repeating unit (B):

(A) a hydrophilic repeating unit; and
(B) a repeating unit comprising, at the terminal of a side chain, a structural unit represented by the following Formula (b1)

(b1)

wherein, in Formula (b1), R$^{32}$ is an alkylene group having 2 to 4 carbon atoms, R$^{33}$ is an alkyl group having 5 to 30 carbon atoms, and m represents 2 to 100 as an average value.

13. The method of claim 1, which does not comprise bringing the device into contact with the heated product of the solution comprising the polymer having the repeating unit (A) and the repeating unit (B).

14. The method of claim 1, wherein the method comprises the heating and a temperature of the heating is in a range of from 30° C. to 150° C.

15. The method of claim 1, wherein the method comprises the heating and the heating is carried out when the device is subjected to autoclave sterilization.

16. The method of claim 1, wherein the method comprises the heating and the heating is conducted for 20 minutes to 72 hours, or the method comprises the bringing and the heated product is obtained by a process comprising heating the solution for 20 minutes to 72 hours.

17. The method of claim 1, wherein the method comprises the bringing and the heated product is obtained by a process comprising heating the solution at a temperature in a range of from 30° C. to 150° C.

18. The device of claim 12, wherein the heated product is obtained by a process comprising heating the solution at a temperature in a range of from 30° C. to 150° C.

19. The device of claim 12, wherein the heated product is obtained by a process comprising heating the solution for 20 minutes to 72 hours.

20. The device of claim 12, wherein the repeating unit (B) is represented by the following Formula (b2):

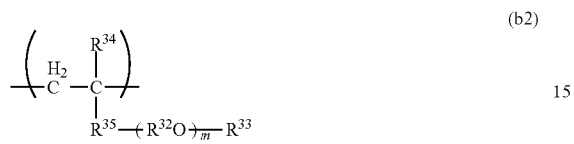

(b2)

wherein, in Formula (b2), $R^{32}$, $R^{33}$, and m are defined as in Formula (b1); $R^{34}$ represents a hydrogen atom or a methyl group; and $R^{35}$ represents —O—, —(C=O)—O—, —(C=O)—NR$^{36}$—, —NR$^{36}$—(C=O)— wherein $R^{36}$ represents a hydrogen atom or an organic group having 1 to 10 carbon atoms; and the symbol  represents the position of bonding to the carbon atom in Formula (b2), to which $R^{34}$ is bonded, or a phenylene group.

* * * * *